US010169210B2

(12) United States Patent
Hisagi et al.

(10) Patent No.: US 10,169,210 B2
(45) Date of Patent: Jan. 1, 2019

(54) ASSOCIATION BETWEEN A TEST CASE AND SOURCE CODE

(71) Applicant: International Business Machines Corporation, Armonk, NY (US)

(72) Inventors: Sakura B. Hisagi, Yamato (JP); Asuka Unno, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 15/232,068

(22) Filed: Aug. 9, 2016

(65) Prior Publication Data

US 2018/0046569 A1 Feb. 15, 2018

(51) Int. Cl.
*G06F 11/36* (2006.01)
*G06F 9/44* (2018.01)
*G06F 9/445* (2018.01)

(52) U.S. Cl.
CPC ................. *G06F 11/3672* (2013.01)

(58) Field of Classification Search
CPC ............. G06F 11/3688; G06F 11/3684; G06F 11/3692; G06F 11/368; G06F 11/3672; G06F 11/3664; G06F 8/71
See application file for complete search history.

(56) References Cited

U.S. PATENT DOCUMENTS 8,001,532 B1  8/2011  Jakubiak et al.
8,504,998 B2  8/2013  Prasad
8,589,884 B2 * 11/2013  Gorthi ................. G06F 11/3688
                                                714/38.1
8,676,723 B2  3/2014  Jung
(Continued)

FOREIGN PATENT DOCUMENTS

JP  2008129661 A  6/2008
JP  2010067188 A  3/2010
JP  2013149094 A  8/2013

OTHER PUBLICATIONS

Herzig et al., Mining Cause-Effect-Chains from Version Histories, 10 pages (Year: 2011).*

(Continued)

*Primary Examiner* — Thuy Dao
(74) *Attorney, Agent, or Firm* — Gilbert Harmon, Jr.

(57) ABSTRACT

The present invention may be a method, a system, and/or a computer program product. An embodiment of the present invention provides a computer-implemented method for associating one or more test cases with one or more source code parts for a test target, or vice versa. The method comprises the followings: obtaining one or more historical data in which one or more modification histories made in one or more source codes are associated with one or more test operation histories made in the test target after the one or more modifications; for each of the historical data, determining whether the test operation history has one or more parts which are identical or similar with those in one or more test cases; and if the determination is positive, associating the one or more test cases with one or more source code parts in the one or more modification histories which have been associated with the test operation history, or vice versa.

15 Claims, 20 Drawing Sheets

(56) References Cited

U.S. PATENT DOCUMENTS

| | | | |
|---|---|---|---|
| 8,997,055 B2* | 3/2015 | van Gogh | G06F 11/3604 |
| | | | 714/38.1 |
| 9,652,366 B2* | 5/2017 | Sivanesan | G06F 11/3672 |
| 9,898,390 B2* | 2/2018 | Yang | G06F 11/3668 |
| 2006/0168565 A1* | 7/2006 | Gamma | G06F 11/3688 |
| | | | 717/122 |
| 2008/0133472 A1* | 6/2008 | Patterson | G06F 9/4443 |
| 2008/0155343 A1* | 6/2008 | Branca | G06F 11/3688 |
| | | | 714/38.14 |
| 2011/0161936 A1* | 6/2011 | Huang | G06F 11/3688 |
| | | | 717/130 |
| 2012/0030516 A1* | 2/2012 | De Keukelaere | G06F 11/3684 |
| | | | 714/38.1 |
| 2014/0245264 A1* | 8/2014 | Bartley | G06F 8/70 |
| | | | 717/124 |
| 2015/0378873 A1* | 12/2015 | Prasad | G06F 11/3684 |
| | | | 714/38.1 |
| 2016/0117239 A1* | 4/2016 | Hamilton, II | G06F 11/3684 |
| | | | 717/124 |
| 2017/0139815 A1* | 5/2017 | D'Andrea | G06F 11/3688 |

OTHER PUBLICATIONS

Lin et al., History-Based Test Case Prioritization with Software Version Awareness, 2 pages (Year: 2013).*
Hisagi et al., "Association Between a Test Case and Source Code", U.S. Appl. No. 15/838,438, filed Dec. 12, 2017, 55 pages.
IBM, Appendix P, list of patents or patent applications treated as related, filed herewith, 2 pages.

* cited by examiner

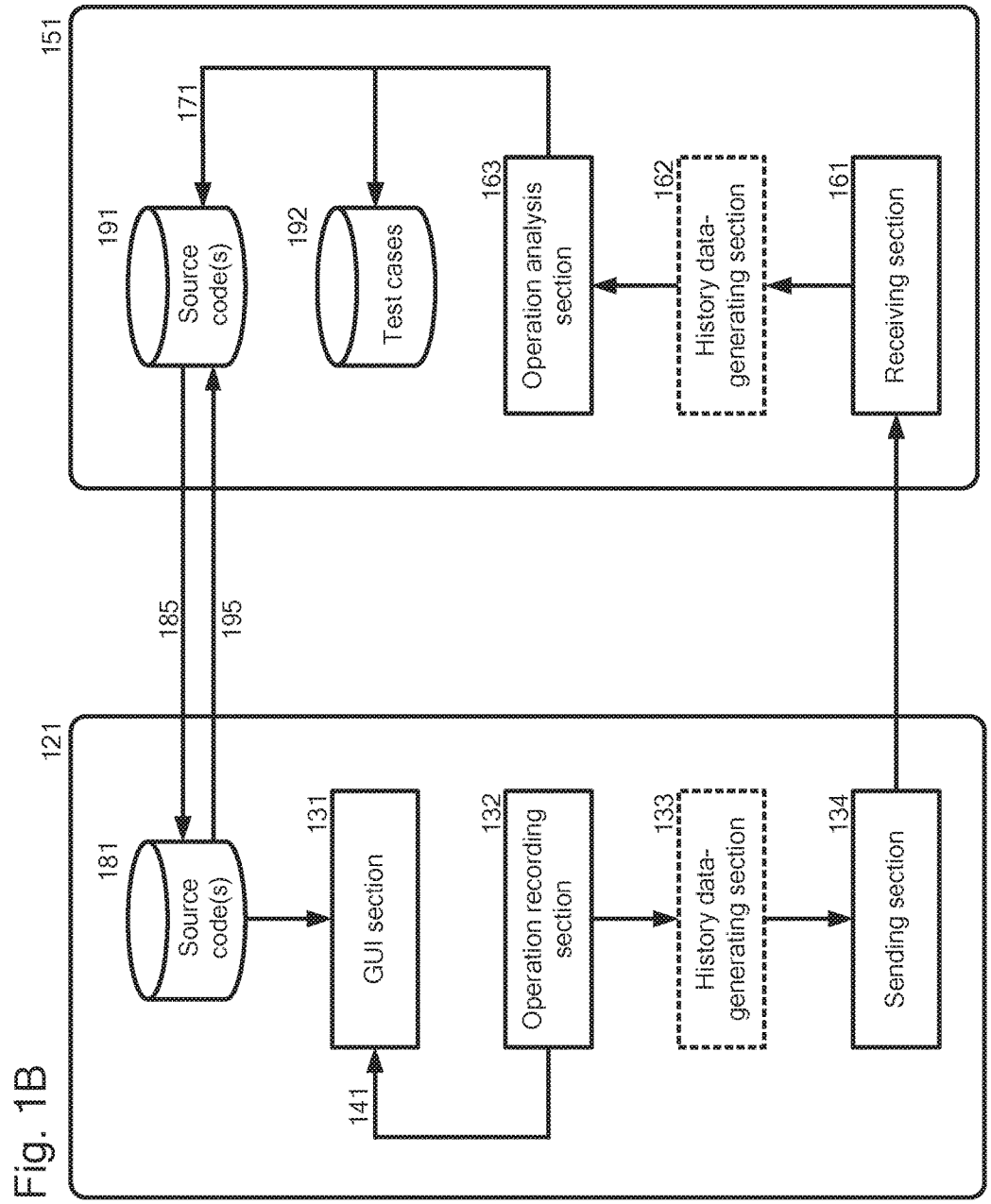

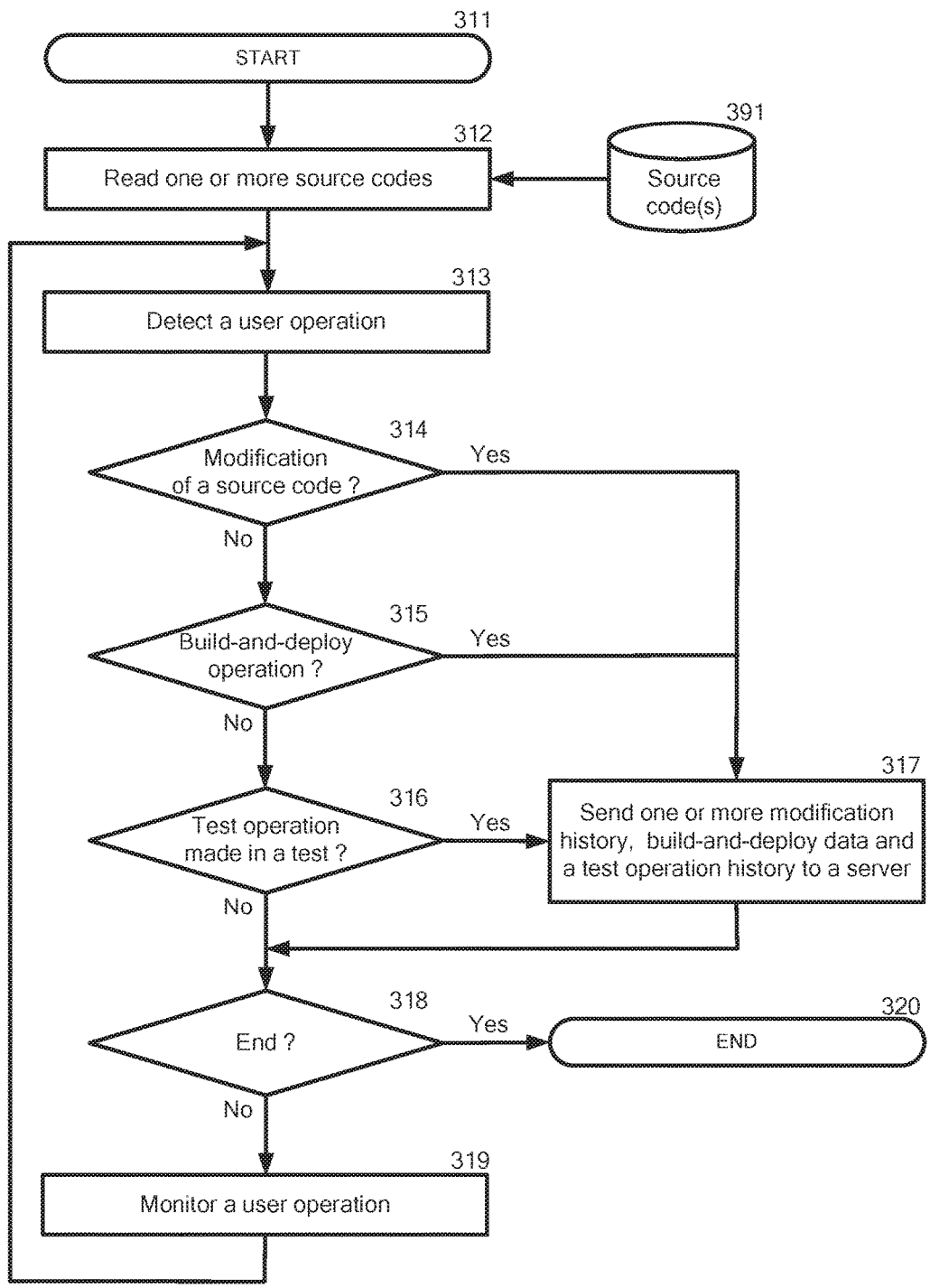

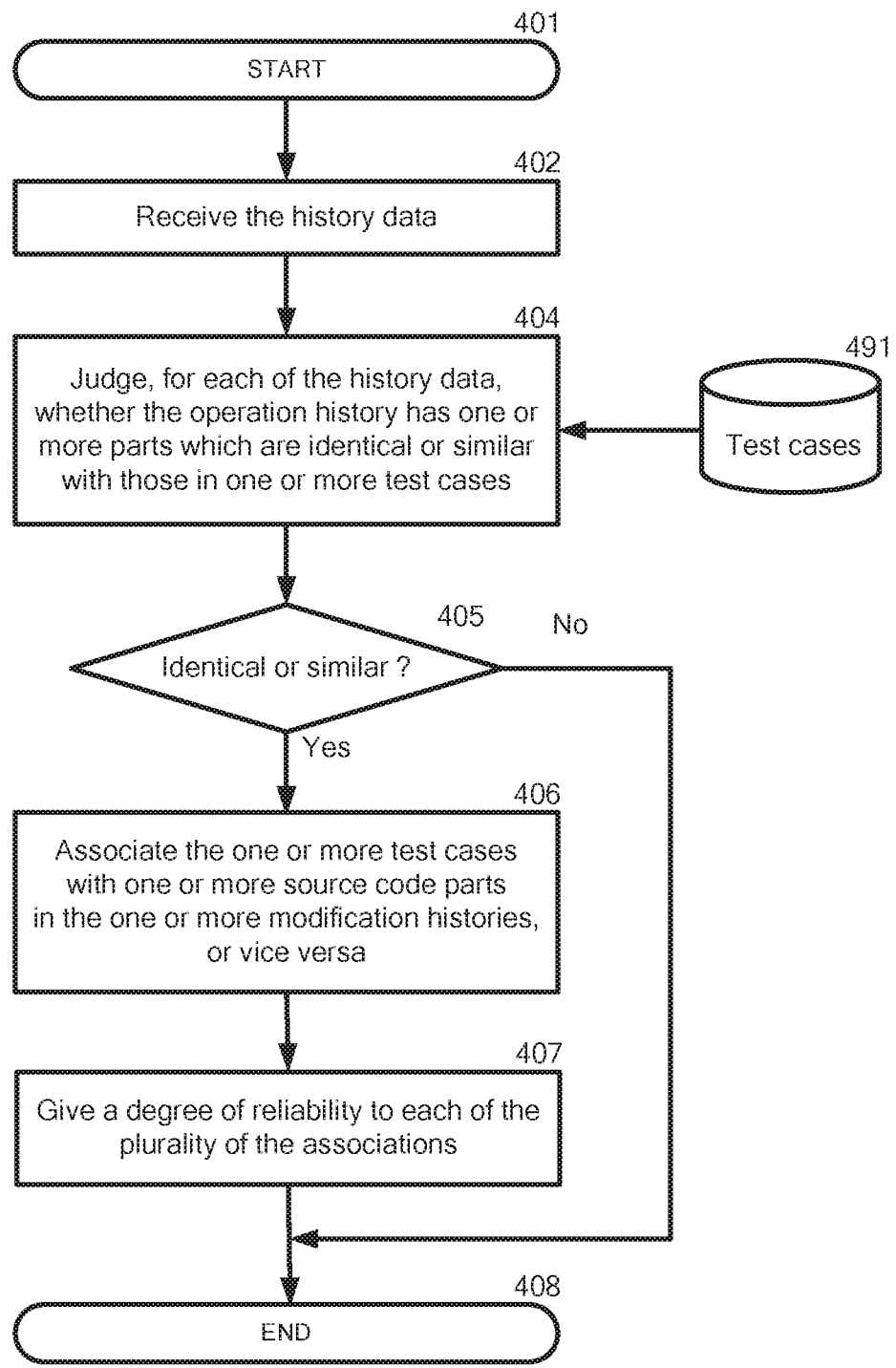

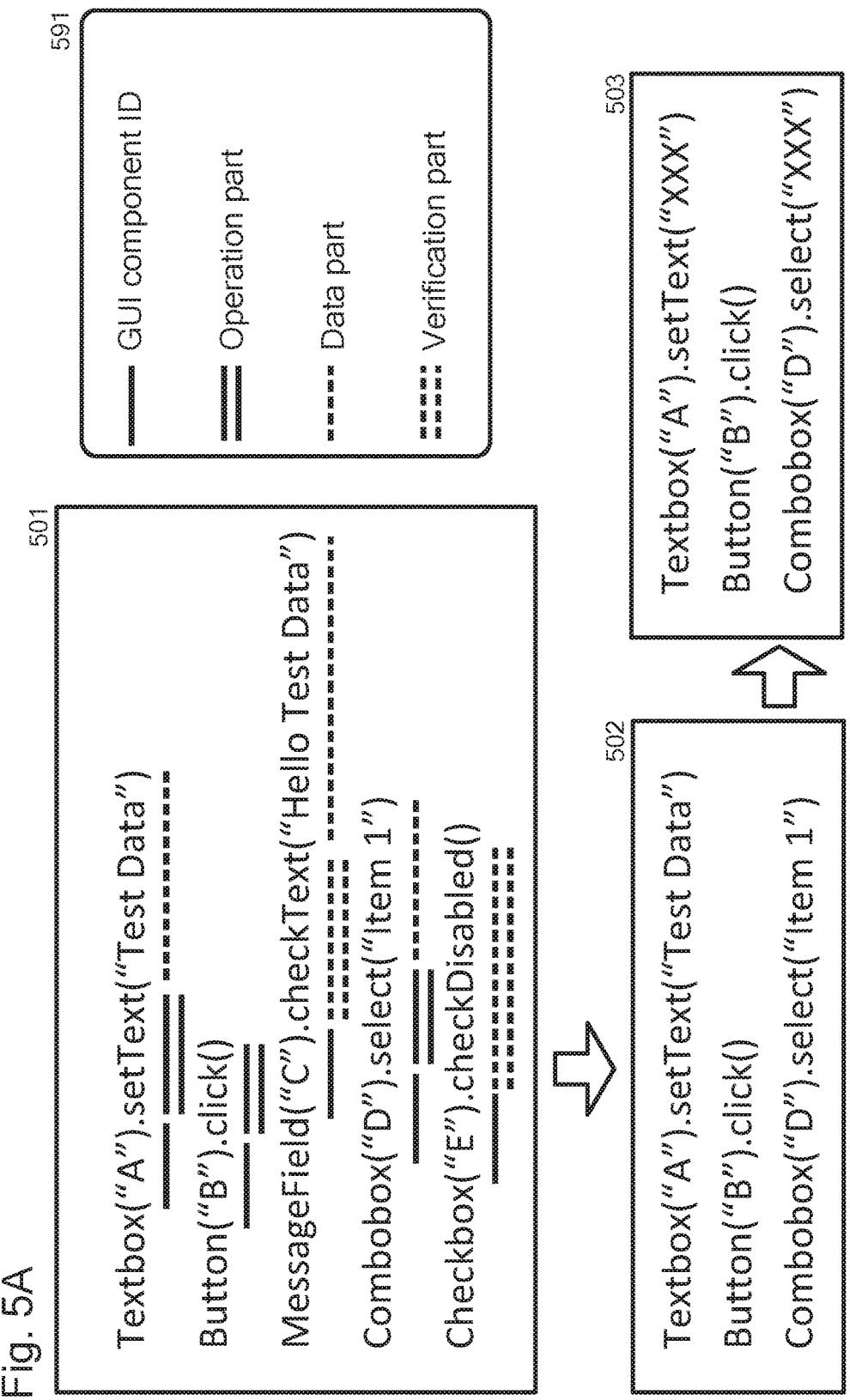

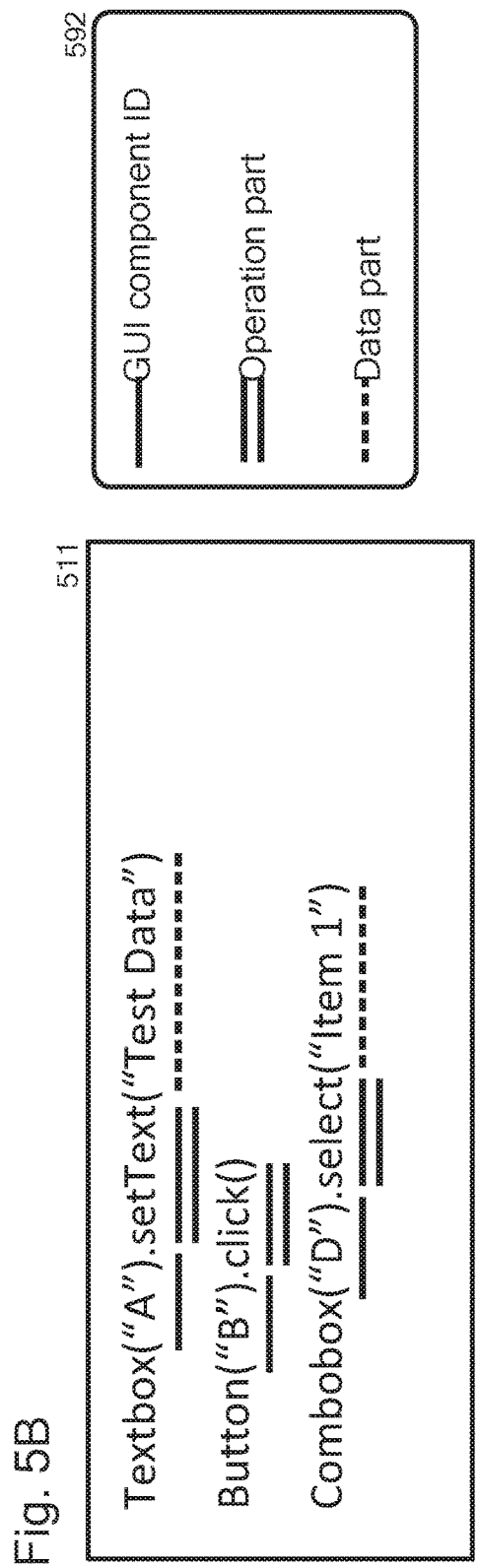

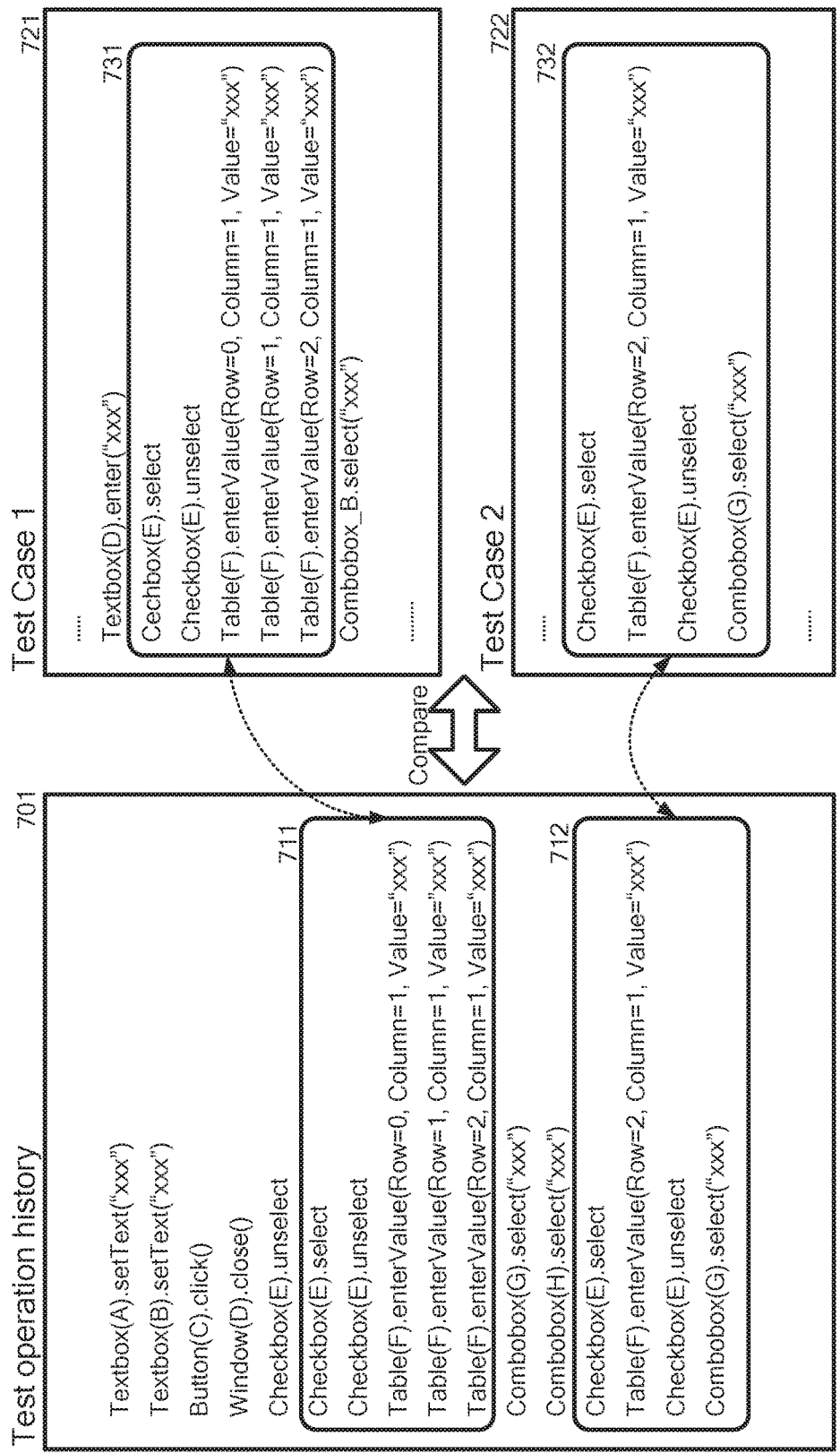

Fig. 7B

| Test operation hisotry | | Test case(s) associated with each of the test operation histories | |
|---|---|---|---|
| Textbox(A).setText("xxx") | 751 | Test Case 1 | 761 |
| Textbox(B).setText("xxx") | | Test Case 2 | |
| Button(C).click() | | ... | |
| Window(D).close() | | Test Case 21 | |
| Checkbox(E).select | 752 | Test Case 1 | 762 |
| Checkbox(E).unselect | | Test Case 15 | |
| Table(F).enterValue(Row=0, Column=1, Value="xxx") | | Test Case 16 | |
| Table(F).enterValue(Row=1, Column=1, Value="xxx") | | | |
| Table(F).enterValue(Row=2, Column=1, Value="xxx") | | | |
| Checkbox(E).select | 753 | Test Case 5 | 763 |
| Table(F).enterValue(Row=2, Column=1, Value="xxx") | | | |
| Checkbox(E).unselect | | | |
| Combobox(G).select("xxx") | | | |

741

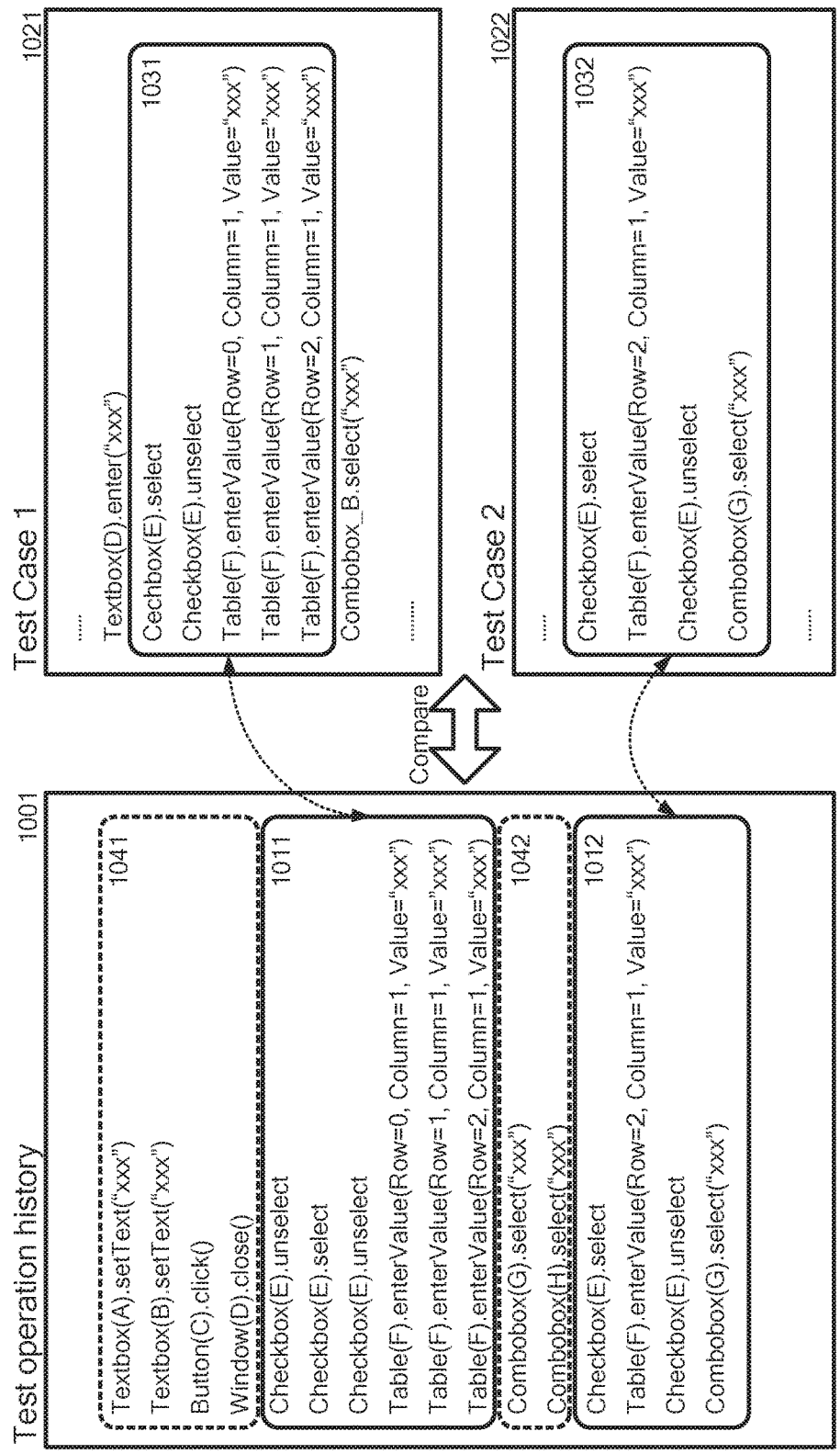

ASSOCIATION BETWEEN A TEST CASE AND SOURCE CODE

BACKGROUND

The present invention relates to a development of a program, and more specifically, to an association of one or more test cases with one or more source codes parts, or vice versa.

In order to fully test that all requirements of an application are met, test cases are used. A test case is characterized by a known input and by an expected output, which is worked out before the test is executed. The known input is used for testing a pre-condition and the expected output is used for testing a post-condition.

The number of test cases may increase as the size of the test cases become larger, due to expansions and new developments of a program, for example, an application, software or script.

SUMMARY

According to one aspect of an embodiment of the present invention, the embodiment of the present invention provides a computer-implemented method for associating one or more test cases with one or more source code parts for a test target, or vice versa. The method comprises: obtaining one or more historical data in which one or more modification histories made in one or more source codes are associated with one or more test operation histories made in the test target after the one or more modifications; for each of the historical data, determining whether the test operation history has one or more parts which are identical or similar with those in one or more test cases; and if the determination is positive, associating the one or more test cases with one or more source code parts in the one or more modification histories which have been associated with the test operation history, or vice versa.

According to another aspect of an embodiment of the present invention, a system comprising a computer readable storage medium storing a program of instructions executable by the system to perform one or more methods described herein also may be provided.

According to another aspect of an embodiment of the present invention, a computer program product comprising a computer readable storage medium storing a program of instructions executable by the system to perform one or more methods described herein also may be provided.

BRIEF DESCRIPTION OF THE DRAWINGS

FIG. 1B illustrates exemplified basic block diagrams of a user computer and server computer, each of which may be used in an embodiment of the present invention;

FIGS. 3A and 3B illustrate one embodiment of a flowchart of a process which can be done in the user computer;

FIGS. 4A and 4B illustrate one embodiment of a flowchart of a process which can be done in the server computer;

FIG. 5A illustrates an embodiment of a test case which may be used in an embodiment of the present invention;

FIG. 5B illustrates an embodiment of a test operation history which may be used in an embodiment of the present invention;

FIG. 7A illustrates an embodiment of an exemplified diagram of comparing a test operation history and test cases;

FIG. 7B illustrates an embodiment of an exemplified diagram of associating each of one or more test operation histories with one or more test cases;

FIG. 10 illustrates an embodiment of an exemplified diagram of finding one or more test cases which are not present in a repository for test cases;

DETAILED DESCRIPTION

Figure 1A:
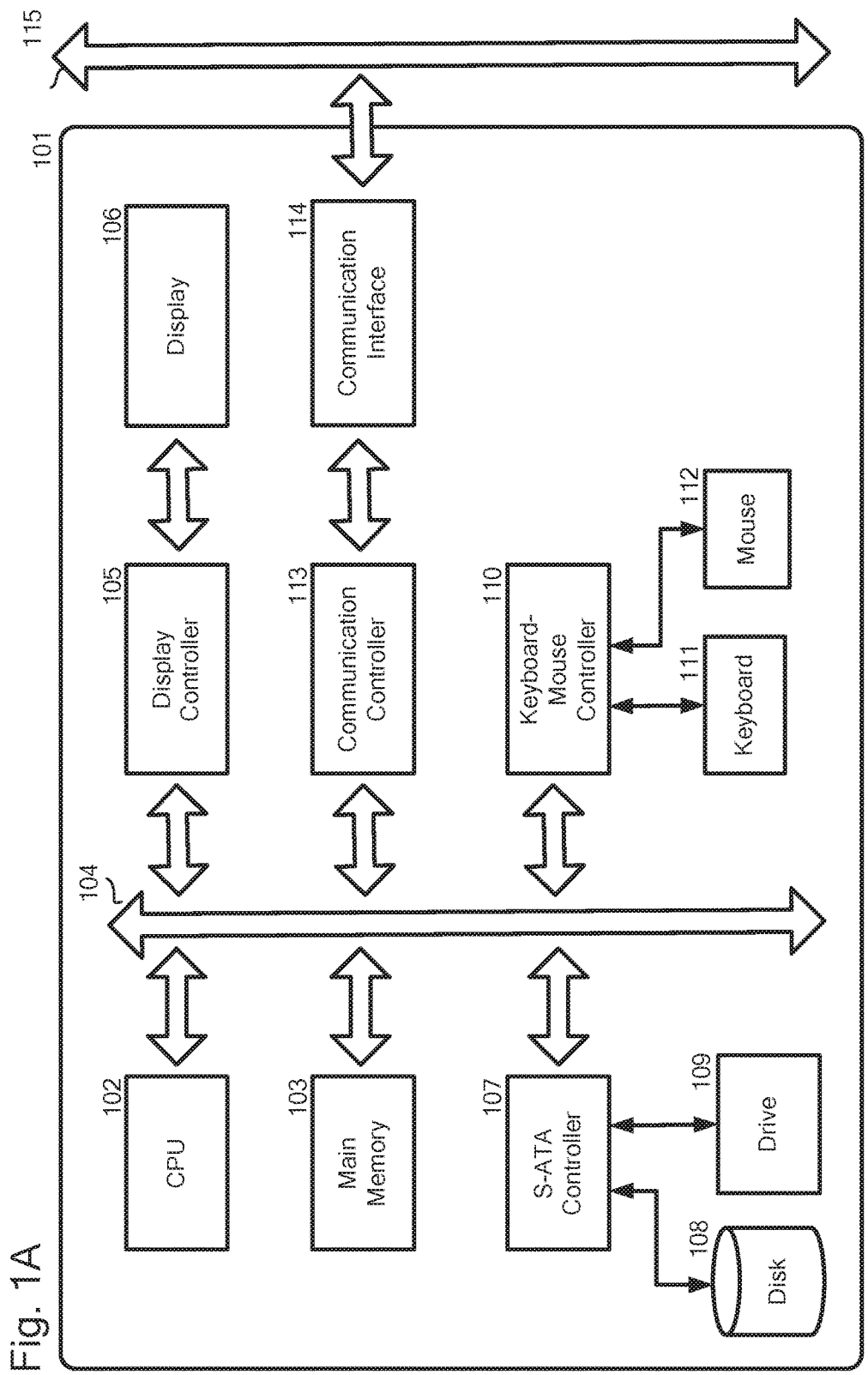
FIG. 1A illustrates an exemplified basic block diagram of a computer hardware used in an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term, "source code", refers to any code which is used for computer instructions and may be written using human-readable or non human-readable computer language. The source code may be also referred to as "code" or "program list".

The term, "test case", refers to a document which may have a set of conditions under which a user such as a developer or tester will determine a program, for example, an application, software or script can be working as it was originally intended to work.

The idea of an embodiment of the present invention is on the basis of the following perceptions: in a development of a program, for example, an application, software or script, the user repeats the following three steps: step 1: making a code modification(s) in a source code(s); step 2: performing a build-and-deploy process; and step 3: testing, by the user through a graphical user interface, a test target after the modification(s). In the three steps, information in a brain of the user will be reflected, especially in step 3. The information may be, for example, one regarding which source code may be linked with a specific operation(s) by the user through a graphical user interface. This means that tacit knowledge may be used in these steps.

There is need to obtain information on an association between one or more test cases and one or more source code parts for a test target in order to know which part(s) in the source code(s) relates to or affects the test case(s). A source code part may be specified by one or more source code lines or one or more units of a source code block.

This association may be useful for identifying or selecting test case(s) which should be preferentially carried out even when there is not enough time to run a full-scale test after a build-and-deploy process in a development of a program, for example, an application, software or script.

Further, this association may be helpful for a user such as a developer or tester who does not have enough skills or experiences to perform a test for a test target to understand which part(s) in a source code(s) relates to a test case(s).

In the followings, an embodiment of the present invention will be explained by referring to FIGS. 1A and 1B, 2, 3A and 3B, 4A and 4B, 5A and 5B, 6, 7A and 7B, 8A and 8B, 9, 10, 11 and 12.

With reference now to FIG. 1A, FIG. 1A illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture.

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards.

The summary of an embodiment of the present invention will be explained below by referring to FIG. 1B.

With reference now to FIG. 1B, FIG. 1B illustrates exemplified basic block diagrams of a user computer and server computer, each of which may be used in an embodiment of the present invention.

The user computer (121) may be used by a user such as a developer or tester of a program, for example, an application, software or script. The user computer (121) may be used mainly for recording user operations done by the user through a graphical user interface. The user operations may be the following: (i) a modification(s) of a source code(s) for a test target; (ii) a build-and-deploy process; and (iii) a test operation(s) done in a test for a test target after the modification(s). The user computer (121) may have identical or similar hardware component of the computer (101) described in FIG. 1A.

The server computer (151) may be used mainly for analyzing the operations to associate one or more test cases with one or more source code parts, or vice versa. The server computer (151) may be, for example, but not limited to, a repository server. The server computer (151) may have identical or similar hardware component of the computer (101) described in FIG. 1A.

The user computer (121) can communicate with the server computer (151) through an internet or an intranet.

As stated above, the user computer (121) may be different from the server computer (151), or the same as the server computer (151).

The user computer (121) may comprise a graphical user interface (GUI) section (131), an operation recording section (132) and a sending section (134). Optionally, the user computer (121) may further comprise a history data-generating section (133) in a case where the server computer (151) does not comprise a corresponding section, such as a history data-generating section (162) mentioned below.

The GUI section (131) may read a source code(s) from a storage (181) which can be accessible by the user computer (121) and display an interface for displaying a source code(s) and for allowing the user to modify the source code(s). The GUI section (131) may further display an interface for performing a build-and-deploy process. The GUI section (131) may further display an interface for performing a test for the test target after the modification of the source code(s).

The operation recording section (132) may detect and record (141) the following user operations done by the user through the GUI section (131): (i) a modification(s) of a source code(s); (ii) a build-and-deploy process; and (iii) a test operation(s) done in a test for a test target after the modification(s).

The history data-generating section (133) may generate one or more history data (or historical data). In one embodiment, the history data comprises the following: (i) one or more modification histories associated with one or more modifications done in the source code; and (ii) one or more test operation histories associated with one or more test operations done in a test for a test target after the one or more modifications. Further, the history data may further comprise a build-and-deploy data which indicates that a build-and-deploy process was carried out.

The sending section (134) may send the history data to the server computer (151) in a case where the user computer (121) comprises the history data-generating section (133). Meanwhile, in a case where the user computer (121) does not comprise the history data-generating section (133) but the server computer (121) comprises the history data-generating section (162), the sending section (134) may send to the server computer (151) the following: (i) one or more modification histories associated with one or more modifications done in the source code; and (ii) one or more test operation histories associated with one or more operations done in a test for a test target after the one or more modifications; and (iii) optionally, a build-and-deploy data.

When a user starts to read the source code(s) in order to modify a source code(s), the user computer (121) may check out (185) the server computer (151). The check out (185) is done in a case where the user computer (121) reads, into a memory or storage (181) which can be accessible by the user computer (121), the source code(s) from a storage (191) which can be accessible the server computer (151).

When a user starts to save a modified source code(s), the user computer (121) may check in (195) the server computer (151). The check in (195) is done in a case where the user computer (121) saves, into the storage (191) which can be accessible the server computer (151), a modified source code(s) from the memory or storage (181) which can be accessible by the user computer (121).

The detailed process which can be done on the user computer (121) will be explained by referring to FIGS. 3A and 3B mentioned below.

The server computer (151) may comprise a receiving section (161) and an operation analysis section (163). Optionally, the server computer (151) may further comprise a history data-generating section (162) in a case where the user computer (121) does not comprise a corresponding section, such as history data-generating section (132) mentioned above.

In a case where the user computer (121) comprises the history data-generating section (133), the receiving section (161) may receive the history data from the user computer (121). Meanwhile, in a case where the user computer (121) does not comprise the history data-generating section (133) but the server computer (121) comprises the history data-generating section (162), the receiving section (161) may receive, from the user computer (121), one or more modification histories and one or more test operation histories and optionally the build-and-deploy data.

The history data-generating section (162) may generate one or more history data from the one or more modification histories and one or more test operation histories and optionally the build-and-deploy data. The history data generated by the history data-generating section (162) may be the same as that generated by the history data-generating section (133).

The operation analysis section (163) may analyze one or more history data by comparing a test operation history in each of the one or more history data with one or more test cases in a storage (192) which can be accessible by the server computer (151). As a result of the analysis, the operation analysis section (163) may associate the one or more test cases with one or more source code parts in the one or more modification histories which have been associated with the test operation history, or vice versa.

The detailed process which can be done on the server computer (151) will be explained by referring to FIGS. 4A and 4B mentioned below.

Prior to an explanation of the flowchart of the process described in each of FIGS. 3A and 3B and FIGS. 4A and 4B, FIG. 2 is first explained.

Figure 2:
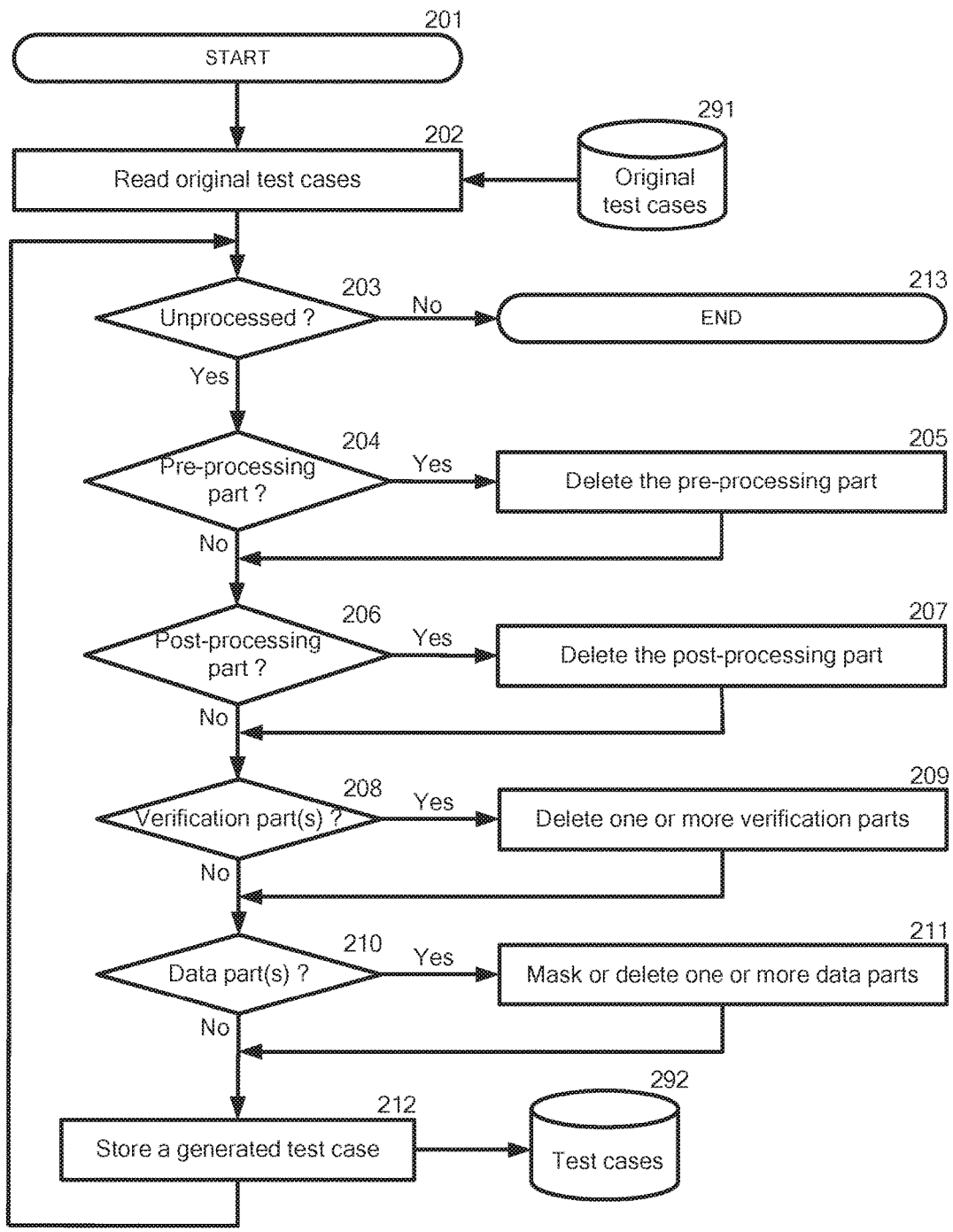
FIG. 2 illustrates one embodiment of a flowchart of a process for preparing, from original test cases, test cases which may be used in an embodiment of the present invention.

With reference now to FIG. 2, FIG. 2 illustrates one embodiment of a flowchart of a process for preparing, from original test cases, test cases which may be used in an embodiment of the present invention.

A system such as the computer (101) performs each of the steps described in FIG. 2. The system may be the same or different from the user computer (121) or the server computer (151).

The process is carried out for the purpose of modifying the original test cases to allow the server computer to efficiently compare a test operation history in a history data with one or more test cases.

In step 201, the system starts the process for preparing test cases from original test cases.

In step 202, the system reads original test cases from a storage (291) which can be accessible by the system. The storage may be in the system or be connected to the system via a cable or wireless. The storage may be a network attached storage (NAS) or a storage in or accessible by a server which can be accessible by the system.

Each of the original test cases may comprise one or more test processing parts and optionally comprise a pre-processing part, a post-processing part, or combination of these. The test processing part may define a test operation for a test target. The test target may be a program or software which is generated by compiling a source code or a source code itself. The test processing part may comprise one or more operation parts, one or more data parts and one or more verification parts. The pre-processing part may define an operation for starting a test for a test target, such as a log-in operation, and can be carried out before the one or more test processing parts are carried out. The post-processing part may define an operation for terminating the test for the test target, such as a log-out operation, and can be carried out after the one or more test processing parts are carried out.

An example of a test case will be shown in FIG. 5A mentioned below.

With reference now to FIG. 5A, FIG. 5A illustrates an embodiment of a test case which may be used in an embodiment of the present invention.

FIG. 5A shows an original test case (501). The original test case (501) has elements such as a graphical user interface component ID(s), an operation part(s), a data part(s) and a verification part(s) (see 591). In the original test case (501), a graphical user interface component ID(s), an operation part(s), a data part(s) and a verification part(s) are strengthened for ease of understanding. The graphical user interface component ID may refer to an ID associated with a graphical user interface component on which an operation shall be made. The operation part may refer to a code which instructs an operation in a test using the test case itself. The data part may refer to data which is used in the test. The verification part may refer to a code which instructs a verification process in the test.

With reference now back to FIG. 2, in step 203, the system determines whether an unprocessed test case remains or not. If the determination is positive, the system retrieves one test case among the unprocessed test case(s) and then proceeds to step 204. Meanwhile, if the determination is negative, the system proceeds to a final step 213.

In step 204, the system determines (or judges) whether the original test case has a pre-processing part or not. If the determination is positive, the system proceeds to step 205. Meanwhile, if the determination is negative, the system proceeds to step 206.

In step 205, the system deletes the pre-processing part from the original test case.

In step 206, the system determines whether the original test case has a post-processing part or not. If the determination is positive, the system proceeds to step 207. Meanwhile, if the determination is negative, the system proceeds to step 208.

In step 207, the system deletes the post-processing part from the original test case.

In step 208, the system determines whether the original test case has one or more verification parts or not. If the determination is positive, the system proceeds to step 209. Meanwhile, if the determination is negative, the system proceeds to step 210.

In step 209, the system deletes, from the original test case, the one or more verification parts and also a code(s) relating to each of the one or more verification parts.

An example of a test case from which the one or more verification parts are deleted will be shown in FIG. 5A.

With reference now to FIG. 5A, the test case (502) shows that the verification parts together with the code(s) relating to each of the one or more verification parts were deleted from the test case (501).

With reference now back to FIG. 2, in step 210, the system determines whether the original test case has one or more data parts or not. If the determination is positive, the system proceeds to step 211. Meanwhile, if the determination is negative, the system proceeds to step 212.

In step 211, the system masks or deletes the one or more data parts from the original test case. Any characters can be used for masking the data parts.

An example of a test case from which the one or more data parts are masked will be shown in FIG. 5A.

With reference now to FIG. 5A, the test case (503) shows that the data parts, "Test Data" in the first line, and "Item 1" in the third line were masked with characters "XXX".

With reference now back to FIG. 2, in step 212, the system stores a generated test case into a storage (292). The system then proceeds back to step 203 in order to repeat steps 203 to 212.

In step 213, the system terminates the process mentioned above.

In the mentioned steps 204 to 210, the steps 204 to 210 can be interchangeable with each other. Further, at least one among steps 204 to 210 can be omitted.

Figure 4B:
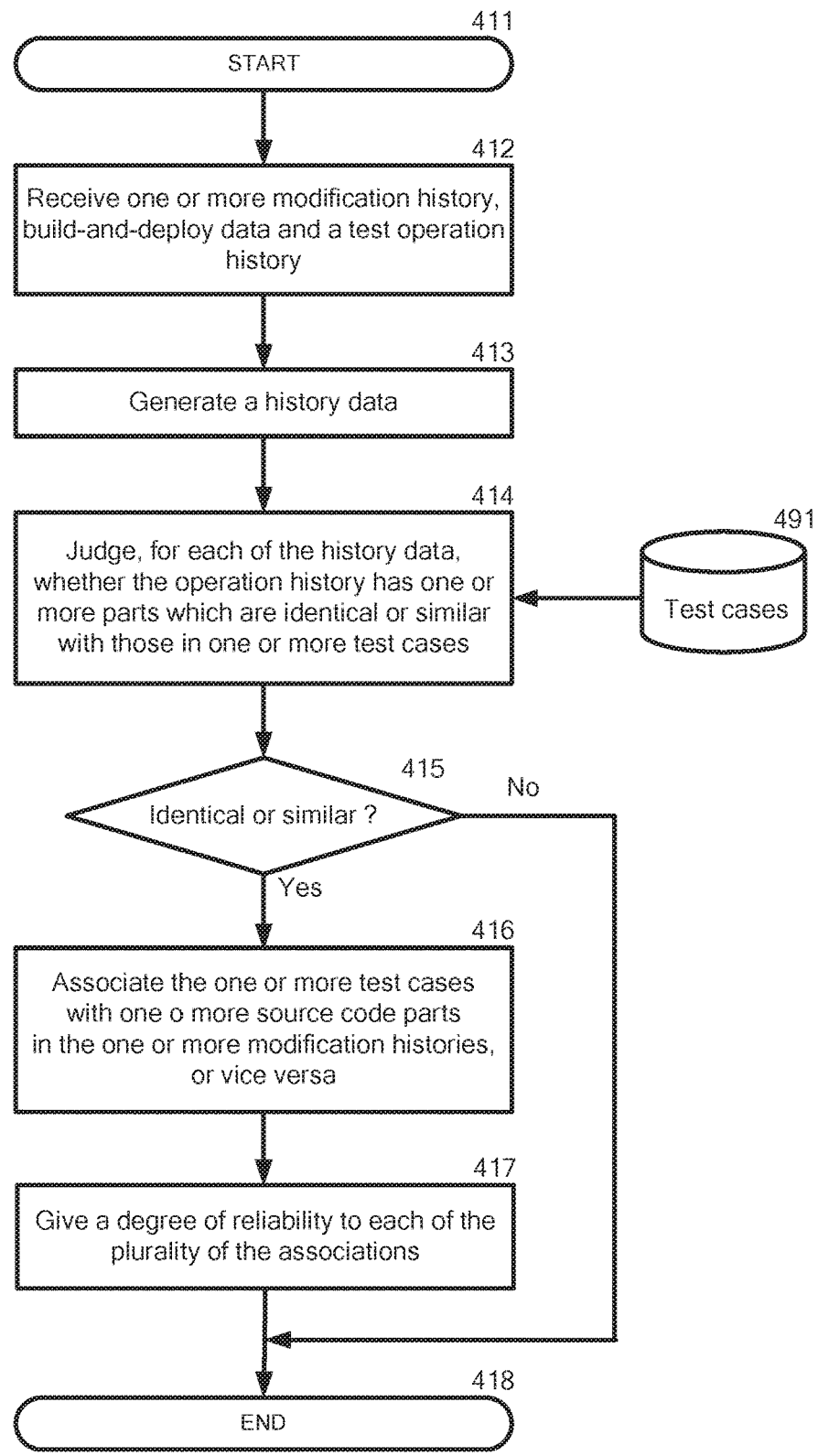

The generated test cases may be used in the process mentioned in each of FIGS. 4A and 4B.

Figure 3A:
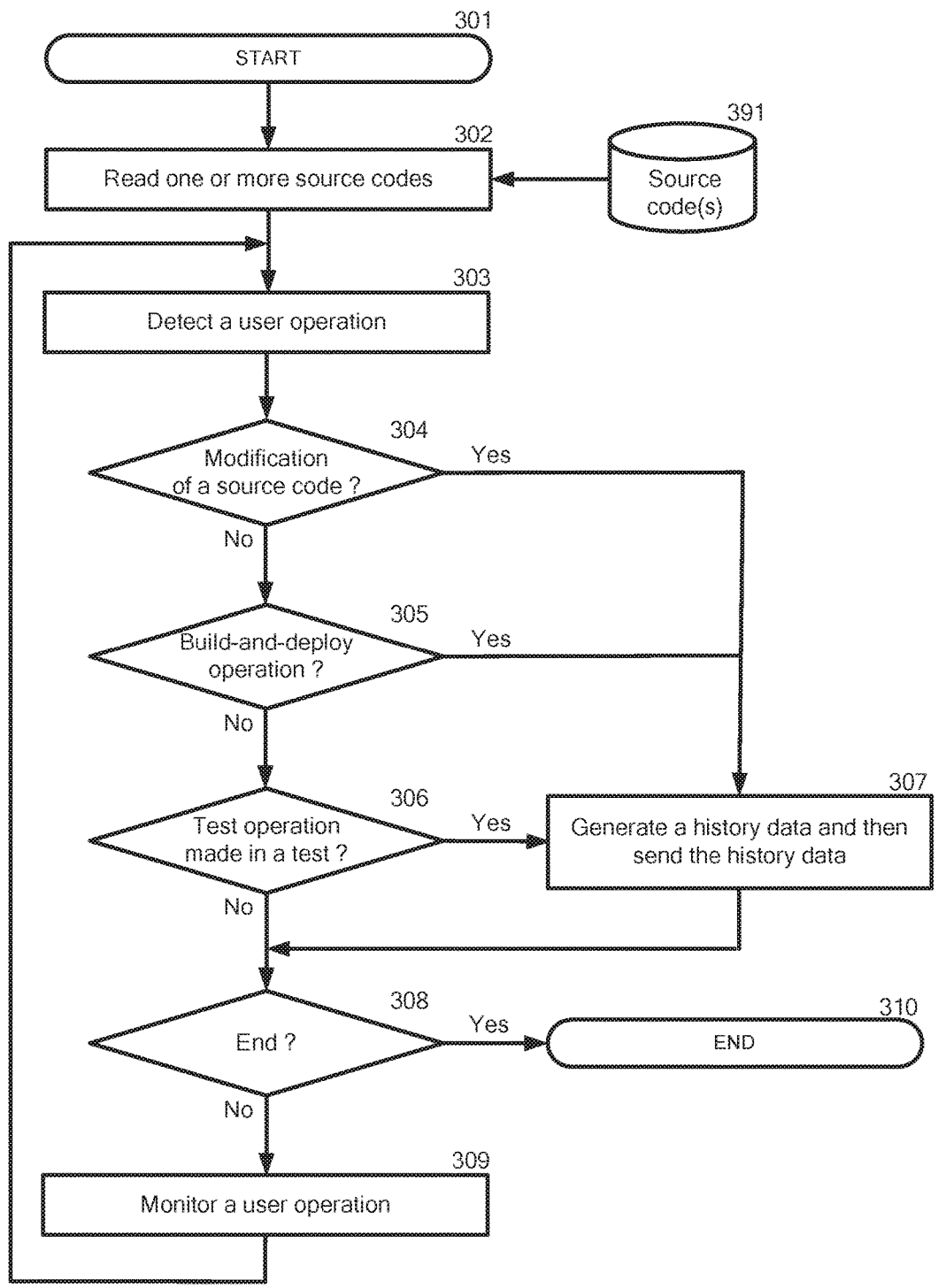

Each of FIGS. 3A and 3B illustrates one embodiment of a flowchart of the process which can be done in the user computer (121). Each of FIGS. 4A and 4B illustrates one embodiment of a flowchart of the process which can be done in the server computer (151).

FIG. 3A illustrates an embodiment of the process for generating one or more modification histories, a build-and-deploy data, and one or more test operation histories and then generating the history data in the user computer (121). FIG. 4A illustrates an embodiment of the process for receiving the history data from the user computer (121) and then analyzing the history data to associate one or more test cases with one or more source code parts, or vice versa.

FIG. 3B illustrates an embodiment of the process for generating one or more modification histories, a build-and-deploy data and one or more test operation histories and then sending them to the server computer (151) in order to generate the history data in the server computer (151). FIG. 4B illustrates an embodiment of the process for generating a history data from one or more modification histories, a build-and-deploy data and one or more test operation histories and then analyzing the history data to associate one or more test cases with one or more source code parts, or vice versa.

The process mentioned in each of FIGS. 3A and 4A is used as a set of the process for associating the one or more test cases with one or more source code parts, or vice versa. The processes mentioned in FIGS. 3B and 4B are used as a set of the process for associating the one or more test cases with one or more source code parts, or vice versa.

With reference now to FIG. 3A, in step 301, the user computer (121) starts the process for generating one or more modification histories, a build-and-deploy data, and one or more test operation histories and then generating a history data. The process may start, for example, when an operating system installed on the user computer (121) is executed.

In response to the start of the process, the user computer (121) may execute an operation monitoring program and then retrieve and record the following information: a location of the source code; a type of a test target program, for example, an application, software or script; and a build-and-deploy data.

In step 302, the user computer (121) reads one or more source codes from a storage (391) which may correspond to the storage (181) described in FIG. 1B.

In step 303, the user computer (121) detects a user operation done by a user, such as a developer or tester, through a graphical user interface and further a graphical user interface component ID(s) on which the user operation was done.

In step 304, the user computer (121) determines whether the user operation is a modification(s) of a source code(s) or not. If the user operation is a modification of a source code, the system generates one or more modification histories associated with one or more modifications done in the one or more source codes and then proceeds to step 307. Meanwhile, if the user operation is not a modification of a source code, the system proceeds to step 305.

In step 305, the user computer (121) determines whether the user operation is a user operation for a build-and-deploy process or not. If the user operation is an operation for a build-and-deploy process, the system generates a build-and-deploy data and then proceeds to step 307. Meanwhile, if the user operation is not an operation for a build-and-deploy process, the system proceeds to step 306.

In step 306, the user computer (121) determines whether the user operation is a test operation(s) done in a test for a test target after the one or more modification or not. If the user operation is a test operation done in a test for a test target after the one or modifications, the system generates one or more test operation histories and then proceeds to step 307. Meanwhile, if the user operation is not a test operation done in a test for a test target after the one or more modifications, the system proceeds to step 308.

Any test operation history which may satisfy the following Conditions 1 and 2 can be used in an embodiment of the present invention.

Condition 1: the following data are written in the test operation history: an ID(s) associated with a graphical user interface on which a test operation by a user such as a developer or tester was done (the ID is referred to "a graphical user interface component ID"); operation data which was obtained by scanning the test operation(s) done by the user; and data which was input by the user for a test target; and Condition 2: in each of a predetermined test operation(s), a verification data is written in the test operation history.

The above conditions are satisfied by a general script description method in a GUI automatic test tool.

An example of a test operation history will be shown in FIG. 5B mentioned below.

With reference now to FIG. 5B, FIG. 5B illustrates an embodiment of a test operation history which may be used in an embodiment of the present invention.

FIG. 5B shows a test operation history (511). The test operation history (511) has elements such as a graphical user interface component ID(s), an operation part(s) and a data part(s) (see 592). Unlike the test case (501), the test operation history (511) may not have an element of a verification process. This is because the verification may be directly done by an eye of the user and, therefore, a verification made by the eye of the user is not recorded. In the test operation history (511), a graphical user interface component ID(s), an operation part(s) and a data part(s) of each are strengthened for ease of understanding. Each of the definitions of a graphical user interface component ID(s), an operation part(s) and a data part(s) is the same with that for a test case.

With reference now back to FIG. 3A, in step 307, the user computer (121) generates a history data from the one or more modification histories, the build-and-deploy data, and the one or more test operation histories. In the history data, one or more modification histories made in one or more source codes may be associated with one or more test operation histories made in the test target after the one or more modifications. Accordingly, the following combination can be available: one modification history and one test operation history; one modification history and a plurality of test operation histories; a plurality of modification histories and one test operation history; and a plurality of modification histories and a plurality of test operation histories.

The association may be done by finding, from one or more user operation histories made in a time sequence order, a set of one or more source code modifications and one or more test operations and then generating the history data for the set.

The association between the one or more modification histories and the one or more test operation histories can be made by the following manner.

1. The user computer (121) may find a build-and deploy data and then find one or more modification histories and one or more the test operation histories, using the build-and deploy data. The user computer (121) then make a set of one or more modification histories, a build-and deploy data and one or more the test operation histories to associate one or more modification histories with one or more test operation histories.

2. The user computer (121) detects a pressing of a button for starting and ending a code modification, of a button for carrying out a build-and deploy process, and of a button for starting and ending a test for a test target. The user computer (121) then make a set of one or more modification histories, a build-and deploy data and one or more the test operation histories to associate one or more modification histories with one or more test operation histories.

3. The user computer (121) detects a process for a code modification(s), a build-and-deploy process and a test for a test target and then determines whether the process was carried out in a predetermined period. If the determination is positive, the user computer (121) then make a set of one or more modification histories, a build-and deploy data and one or more the test operation histories to associate one or more modification histories with one or more test operation histories.

The user computer (121) then may send the history data to the server computer (151) in a case where the history data is generated; or the predetermined number of the history data is generated; or a predetermined time has passed.

An example of a plurality of history data generated in a time sequence order will be shown in FIG. 6 mentioned below.

Figure 6:
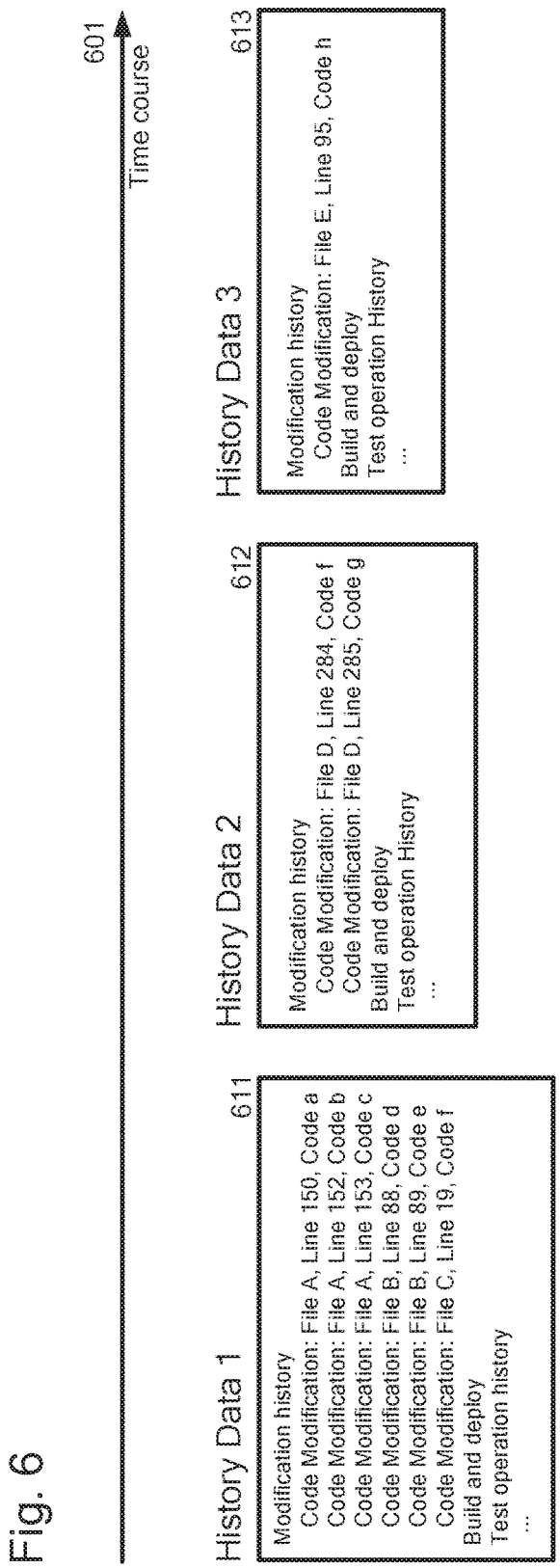
FIG. 6 illustrates an embodiment of an exemplified diagram of a plurality of history data which may be generated in a time sequence order.

With reference now to FIG. 6, FIG. 6 illustrates an embodiment of an exemplified diagram of a plurality of history data which may be generated in a time sequence order.

The following three history data, the history data 1 (611), the history data 2 (612) and the history data 3 (613), are aligned in a time sequence order (601). Each of the history data 1, 2 and 3 (611, 612 and 613) has one or more modification histories, a build-and-deploy data and one or more test operation histories. Each of the modification histories may comprise a file name comprising a source code which was modified, line number in which modification was done, and a source code after the modification. In FIG. 6, the details of the test operation history are omitted in the history data 1, 2 and 3 (611, 612 and 613). An example of the details of the test operation history will be shown in FIGS. 7A and 9A mentioned below.

With reference now back to FIG. 3A, in step 308, the user computer (121) determines whether the process is complete or not. This may be, for example, determined by detecting that an application for the test is terminated. If the process is complete, the system proceeds to a final step 310. Meanwhile, if the process is not complete, the system proceeds to step 309.

In step 309, the user computer (121) monitors a user operation done by a user. In a case where the user computer (121) detects the user operation, the user computer (121) repeats steps 304 to 309.

In step 310, the user computer (121) terminates the process mentioned above.

With reference now to FIG. 3B, in step 311, the user computer (121) starts the process for generating one or more modification histories, a build-and-deploy data, and one or more operation histories and then sending them to the server computer (151).

Steps 312 to 316, 318 and 319 correspond to steps 302 to 306, 308 and 309 described in FIG. 3A, respectively. Accordingly, the explanations of steps 312 to 316, 318 and 319 will be omitted here.

In step 317, the user computer (121) sends to the server computer (151) a set of the one or more modification histories, the build-and-deploy data, and the one or more test operation histories; or sends them independently to the server computer (151).

In step 320, user computer (121) terminates the process mentioned above.

With reference now to FIG. 4A, in step 401, the server computer (151) starts the process for receiving the history data and then analyzing the history data to associate one or more test cases with one or more source code parts, or vice versa. The process may start, for example, in a case where the server computer (151) receives the history data or a predetermined time has passed.

In step 402, the server computer (151) receives the history data from the user computer (121). Step 402 may be repeated, for example, at the time when the server computer (151) receives the history data.

In step 404, the server computer (151) reads one or more test cases from a storage (491) which can be accessible by the server computer (151). The server computer (151) then determines, for each of the history data, whether the test operation history in the history data has one or more parts which are identical or similar with those in one or more test cases.

In one embodiment, the determination is carried out, for example, by comparing a whole or part of the test operation history with a whole or part of each of the one or more test cases. In another embodiment, the determination is carried out using the sequential pattern mining to finding statistically relevant patterns between a whole or part of the test operation history and a whole or part of each of the one or more test cases. The sequential pattern mining is known in the art.

An example of comparing a test operation history with each of the test cases will be shown in FIG. 7A mentioned below.

With reference now to FIG. 7A, FIG. 7A illustrates an embodiment of an exemplified diagram of comparing a test operation history and test cases.

In FIG. 7A, the test operation history (701) and two test cases, the test case 1 (721) and the test case 2 (722) are shown.

The test operation history (701) is included in the history data 1 (611).

In the test operation history (701), the data parts were masked by the characters, "XXX".

In each of the test case 1 (721) and the test case 2 (722), a pre-processing part and a post-processing part were deleted and the data parts were masked by the characters, "XXX".

The server computer (151) compares the test operation history (701) with the test case 1 (721) and then concludes that the part (711) in the test operation history (701) is identical with the part (731) in the test case 1 (721). Further, the server computer (151) compares the test operation history (701) with the test case 2 (722) and then concludes that the part (712) in the test operation history (701) is identical with the part (732) in the test case 2 (722).

With reference now back to FIG. 4A, in step 405, if the determination is positive, the server computer (151) proceeds to step 405. Meanwhile, if the determination is negative, the server computer (151) proceeds to a final step 408.

In step 406, the server computer (151) associates the one or more test cases with one or more source code parts in the one or more modification histories which have been associated with the test operation history, or vice versa.

The association between the one or more test cases and one or more source code parts may be done by associating the one or more test cases with the test operation history in the history data, or vice versa. The history data can be used for making the association. This is because the history data has information on an association between a source code part(s) in the one or more modification histories and one or more test operation histories.

An example of the association of the test operation history with the one or more test case will be shown in FIG. 7B mentioned below.

With reference now to FIG. 7B, FIG. 7B illustrates an embodiment of an exemplified diagram of associating each of the test operation histories with one or more test cases.

In FIG. 7B, Table (741) shows the association between a test operation history and the test case(s) associated with each of the test operation histories. As seen in the table (741), the test operation history (751) is associated with the test cases 1, 2, - - - , 21 (761); the test operation history (752) is associated with the test cases 1, 15 and 16 (762); and the test operation history (753) is associated with the test case 5 (763).

With reference now back to FIG. 4A, in step 407 which is an optional step, the server computer (151) gives a degree of reliability to each of the plurality of the associations.

The server computer (151) may give a degree of reliability in a case where there are a plurality of associations between the one or more test cases and the one or more source code parts.

The detailed examples of step 407 will be explained by referring to FIGS. 8A and 8B, FIG. 9.

Figure 8A:
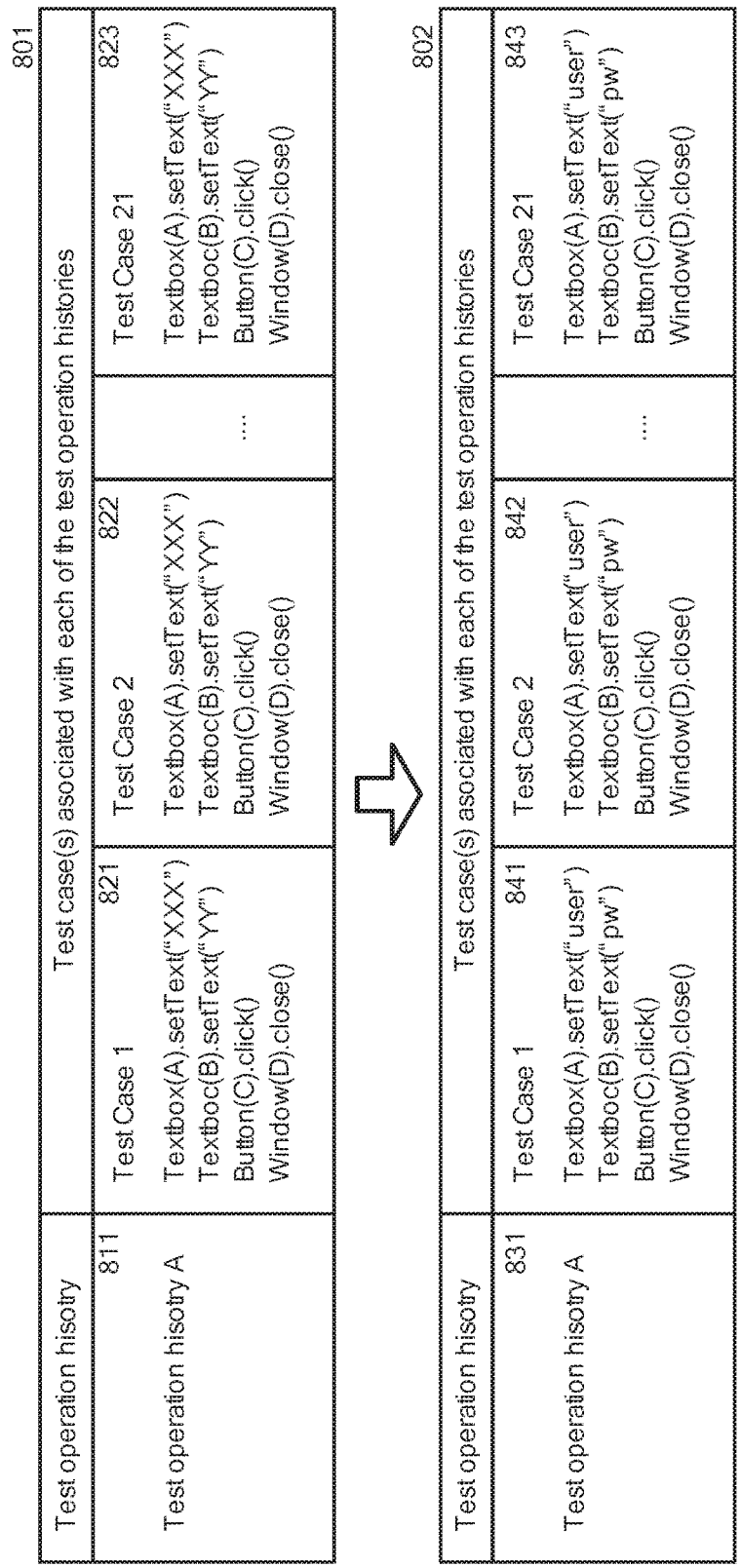
FIGS. 8A and 8B illustrate an embodiment of an exemplified diagram of giving a degree of reliability to each of the plurality of the associations between a test operation history and a plurality of test cases.
Figure 8B:
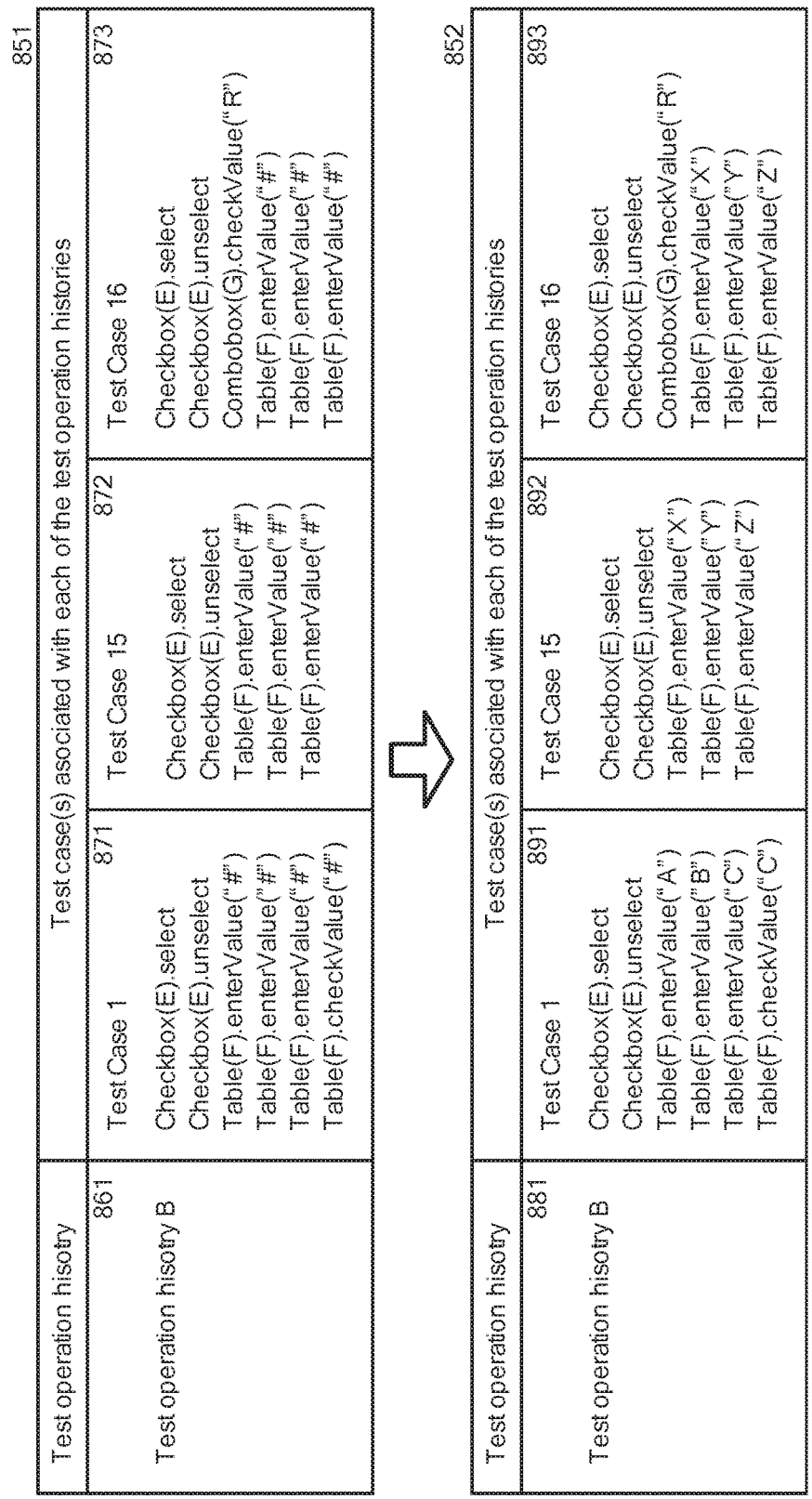

FIGS. 8A and 8B illustrate an embodiment of an exemplified diagram of giving a degree of reliability to each of the plurality of the associations between a test operation history and a plurality of test cases.

With reference now to FIG. 8A, FIG. 8A illustrates an embodiment of an exemplified diagram of giving a lower degree of reliability to each of the plurality of the associations.

Table (801) shows that the test case 1 (821), the test case 2 (822) and the test case 3 (823) are associated with the test operation history A (811). In the test case 1 (821), the test case 2 (822) and the test case 3 (823), the data parts were masked by the characters, "XXX" or "YY". As seen in Table (801), all data for the test case 1 (821), the test case 2 (822) and the test case 3 (823) are identical with each other.

Accordingly, the server computer (151) replaces the characters "XXX" or "YY" with the original characters for unmasking.

Table (802) shows the test case 1 (841), the test case 2 (842) and the test case 3 (843) in which the characters "XXX" or "YY" were replaced with the original characters. As seen in Table (802), all data for the test case 1 (841), the test case 2 (842) and the test case 3 (843) are identical with each other. Further, there is no validation part in test case 1 (841), the test case 2 (842) and the test case 3 (843).

Accordingly, the server computer (151) gives a lower degree of reliability to each of the following associations: the test operation (831) and the test case 1 (841); the test operation (831) and the test case 2 (842); and the test operation (831) and the test case 1 (843). Alternatively, the server computer (151) determines that there is no association between the test operation history A (831) and the test case 1 (841); between the test operation history A (831) and the test case 2 (842); and between the test operation history A (831) and the test case 3 (843) and then makes a cancellation of the associations mentioned above.

The above mentioned example may be useful in a case where original test cases (291) are used in step 404 described in FIG. 4A or step 414 described in FIG. 4B.

Accordingly, the above mentioned example supports the following: in a case where a plurality of the associations between the source code parts and the one or more test cases appear in one of the history data, the mask made in the data parts in each of the plurality of the test cases which have either of the plurality of the associations are unmasked and then compared with each other; and in a case where the data parts on which the unmask was carried out are identical and a verification part does not appear before or after, or between the data parts for each of the plurality of the test cases, a lower degree of reliability is given to each of the plurality of the associations.

With reference now to FIG. 8B, FIG. 8B illustrates an embodiment of an exemplified diagram of giving a higher degree of reliability to each of the plurality of the associations.

Table (851) shows that the test case 1 (871), the test case 15 (872) and the test case 16 (873) are associated with the test operation history B (861). In the test case 1 (871), the test case 15 (872) and the test case 16 (873), the data parts were masked by the characters, "#". The test case 1 (871) has a verification part "checkValue" in the sixth line. Similarly, the test case 16 (873) has a verification part "checkValue" in the third line. As seen in Table (801), all data for the test case 1 (871), the test case 15 (872) and the test case 16 (873) are identical with each other except that each of the test case 1 (871) and test case 3 (823) has a verification part. Accordingly, it can be said that data for the test case 1 (821), the test case 2 (822) and the test case 3 (823) are similar with each other.

Accordingly, the server computer (151) replaces the characters "#" with the original characters for unmasking.

Table (852) shows the test case 1 (891), the test case 15 (892) and the test case 16 (893) in which the characters "#" were replaced with the original characters. As seen in Table (852), the data part in the test case 1 (891), the test case 15 (892) and the test case 16 (893) are different from each other. Further, each of the test case 1 (871) and test case 3 (823) has the verification part.

Accordingly, the server computer (151) gives a higher degree of reliability to each of the following associations: the test operation history B (881) and the test case 1 (891); the test operation history B (881) and the test case 15 (892); and the test operation history B (881) and the test case 16 (893).

Accordingly, the above mentioned example supports: in a case where a plurality of the associations between the source code parts and the one or more test cases appear in one of the history data, the mask made in the data parts in each of the plurality of the test cases which have either of the plurality of the associations are unmasked and then compared with each other; and in a case where the data parts in which the unmask was carried out are different with each other among the plurality of the test cases and a verification part appears before, after, or between the data parts for each of the plurality of the test cases, a higher degree of reliability is given to each of the plurality of the associations.

Figure 9A:
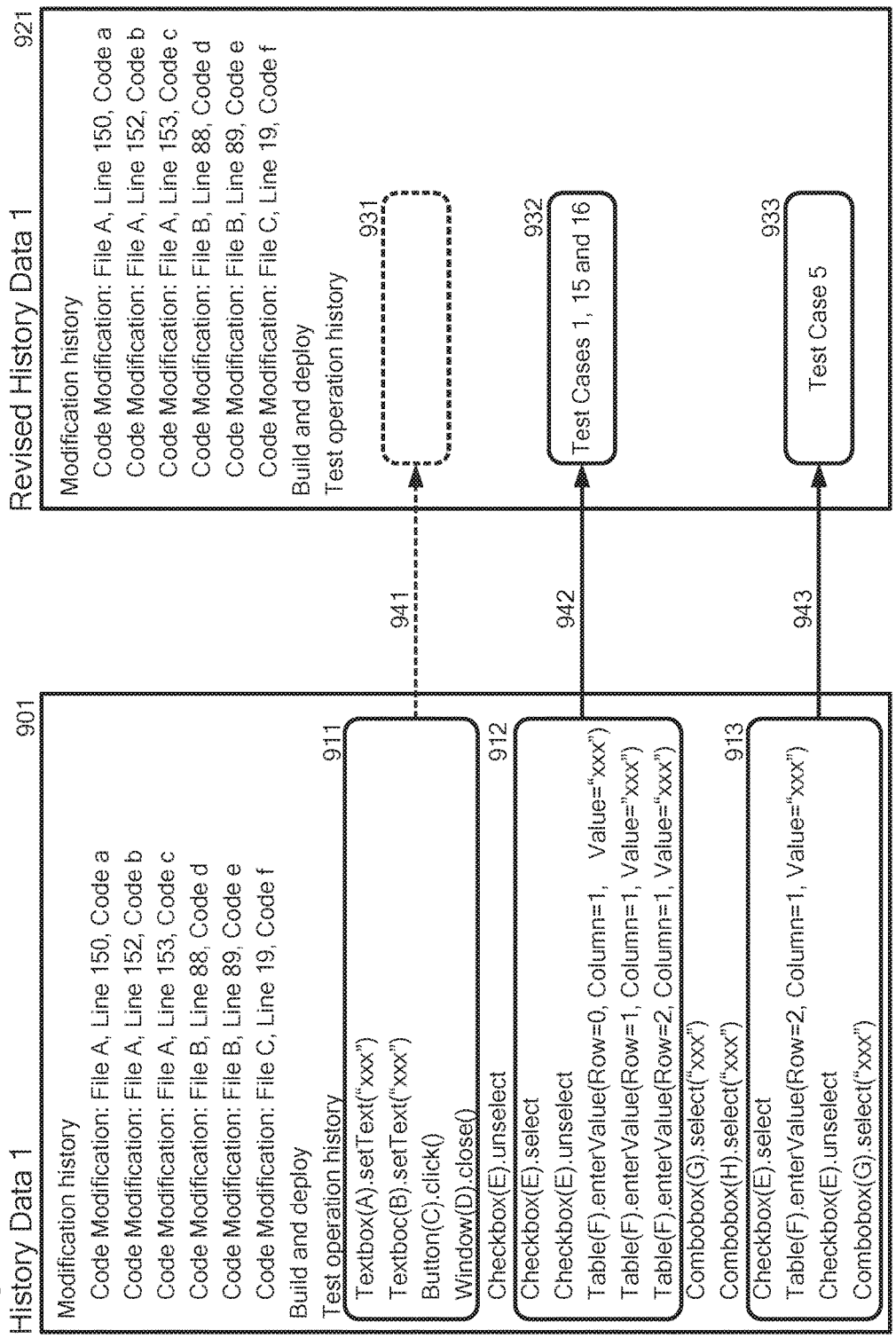
FIG. 9A illustrates an embodiment of an exemplified diagram of replacing one or more parts in a test operation history with one or more test cases which have an identical or similar part in the test operation history.

With reference now to FIG. 9A, FIG. 9A illustrates an embodiment of an exemplified diagram of replacing one or more parts in a test operation history with one or more test cases which have an identical or similar part in the test operation history.

The history data 1 (901) corresponds to the history data 1 (611) described in FIG. 6. The test operation history in the history data 1 (901) is the same as the table (701) described in FIG. 7A.

The server computer (151) may replace a part in a test operation history in a history data with an ID of one or more test cases which are associated with a part in test operation history. This enables the server computer or a user to easily give a degree of reliability to an association.

The part (911) in the history data 1 (901) is the same as the test operation history (751) described in FIG. 7B (751). Test cases 1, 2, . . . , 21 are associated with the test operation history (751) corresponding to the part (911). As stated in the explanation of FIG. 8A, the server computer (151) gives a lower degree of reliability to each of the following associations: the test operation (831) and the test case 1 (841); the test operation (831) and the test case 2 (842); and the test operation (831) and the test case 21 (843). Accordingly, the server computer (151) only deletes the part (911) and does not replace the part (911) with the IDs of the test cases 1, 2, . . . and 21 (see 931).

The part (912) in the history data 1 (901) is the same as the test operation history (752) described in FIG. 7B (751). Test cases 1, 15 and 16 are associated with the test operation history (752) corresponding to the part (912). As stated in the explanation of FIG. 8B, the server computer (151) gives a higher degree of reliability to each of the following associations: the test operation history B (881) and the test case 1 (891); the test operation history B (881) and the test case 15 (892); and the test operation history B (881) and the test case 16 (893). Accordingly, the server computer (151) replaces the part (912) with the IDs of the test cases 1, 15 and 16 (see 932).

The part (913) in the history data 1 (901) is the same as the test operation history (753) described in FIG. 7B (751). Test case 5 is associated with the test operation history (753) corresponding to the part (913). Accordingly, the server computer (151) replaces the part (913) with the ID of the test case 5 (see 933).

As a result, the revised history data (921) are generated. The revised history data can be used for giving a degree of reliability to each of the plurality of the associations.

Figure 9B:
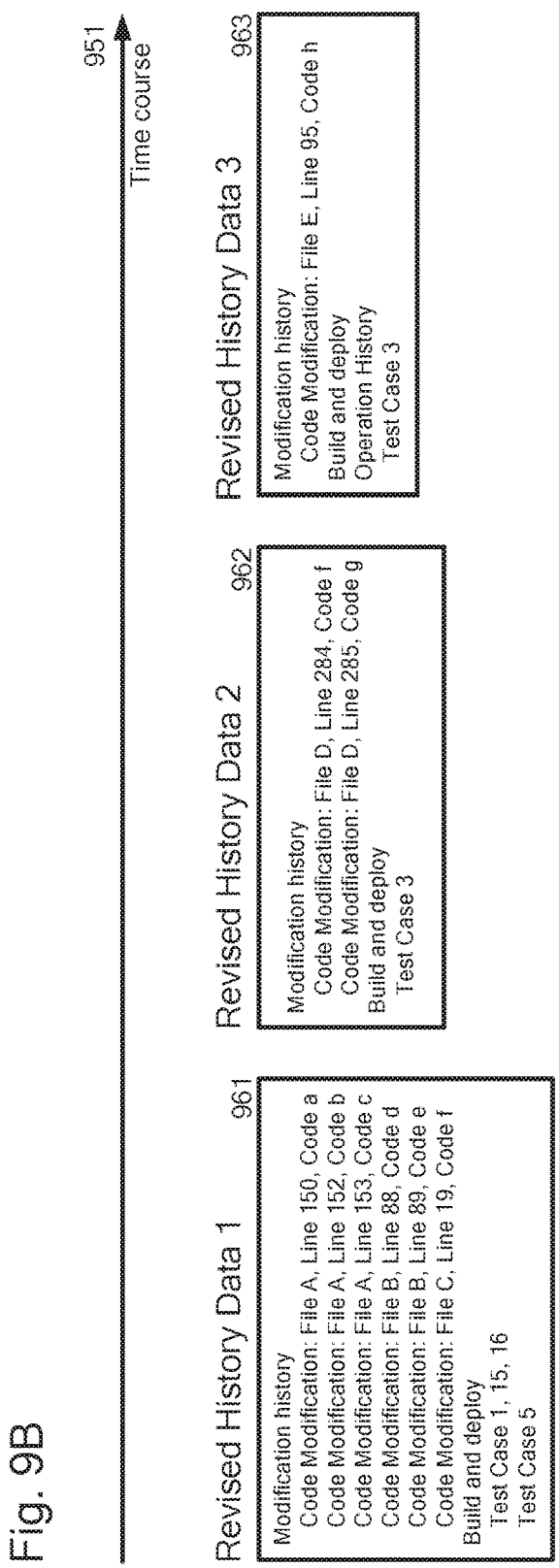
FIG. 9B illustrates an embodiment of an exemplified diagram of a plurality of history data in a time sequence order, in which history data one or more parts in a test operation history are replaced with one or more test cases which have an identical or similar part in the test operation history.

With reference now to FIG. 9B, FIG. 9B illustrates an embodiment of an exemplified diagram of a plurality of history data in a time sequence order, in which history data of one or more parts in a test operation history are replaced with one or more test cases which have an identical or similar part in the test operation history.

The revised history data 1 (961), the revised history data 2 (962) and the revised history data 3 (963), are aligned in a time sequence order (951). Each of the revised history data 1, 2 and 3 (961, 962 and 963) has one or more modification histories, a build-and-deploy data and the one or more IDs of the one or more test cases.

A degree of reliability to each of the plurality of the associations between the source code parts and the one or more test cases may be determined by the following manner. A person know in the art can use other manner mentioned below, using a plurality of the revised history data.

Each of the revised history data 1 (961), the revised history data 2 (962) and the revised history data 3 (963) has six, two and one modification histories, respectively. The server computer (151) gives a higher degree of reliability to a history data having the less number of the modification histories among the plurality of the history data. Therefore, a higher degree of reliability is given to the association in the revised history data 3 (963). This is based on the assumption that the less the number of the modification histories, the larger an association of the code modification and test case is.

Accordingly, the above mentioned example supports: in a case where there are a plurality of the history data, a higher degree of reliability is given to the association between the source code parts and the one or more test cases, for a modification history in a history data having the less number of the modification histories among the plurality of the history data.

The revised history data 1 (961) was generated earlier than the revised history data 2 (962) and the revised history data 3 (963). This means that code modifications in the revised history data 1 (961) were done earlier than those in the revised history data 2 (962) and the revised history data 3 (963). Therefore, a higher degree of reliability is given to the association in the revised history data 1 (961). This is based on the assumption that a user tends to preferentially test a part(s) on a test target which is affected by a code modification(s) of which the user is aware.

Accordingly, the above mentioned example supports: in a case where a plurality of the operations were carried out, a higher degree of reliability is given to the association between the source code parts and the one or more test cases, for a modification history for a test operation which was carried out in an earlier time among the plurality of the operations.

The revised history data 1 (961) has a plurality of the test cases, i.e. the test cases 1, 15 and 16; and test case 5. The test operation histories associated with the test cases 1, 15 and 16 were generated earlier than those associated with the test case 5. This means that code modifications associated with the test cases 1, 15 and 16 were done earlier than those associated with the test case 5. Therefore, a higher degree of reliability is given to the association between the source code parts and the test cases 1, 15 and 16. This is based on the assumption that a user tends to preferentially test a part(s) on a test target which is affected by a code modification(s) of which the user is aware.

Accordingly, the above mentioned example supports: in a case where there are a plurality of test cases having a part which is identical or similar to that part in each of a plurality of the operation histories in one of the history data, a higher degree of reliability is given to the association between the source code parts and the one or more test cases, for a test operation history associated with an operation which is performed early among operations in the plurality of the operation histories in the one of the history data.

The revised history data 2 (962) and the revised history data 3 (963) have a common test case, i.e. the test case 3. The test operation histories associated with the revised history data 2 (962) were generated earlier than those associated with the revised history data 3 (963). This means that code modifications associated with the revised history data 2 (962) was done earlier than those associated with the revised history data 3 (963). Therefore, a higher degree of reliability is given to the association in the revised history data 2 (962). This is based on the assumption that a user tends to preferentially test a part(s) on a test target which is affected by a code modification(s) of which the user is aware.

Accordingly, the above mentioned example supports: in a case where a test operation history in each of a plurality of the history data has a part which is identical or similar with that in one test case, a higher degree of reliability is given to the association between the source code parts and the one or more test cases, for a test operation history associated with an operation in a history data which has been generated earlier among the plurality of the history data.

Further, the above mentioned example supports: in a case where a test operation history in each of a plurality of the history data has a part which is identical or similar with that in one test case, a higher degree of reliability is given to the association between the source code parts and the one or more test cases, for a test operation history associated with a history data having the less number of the modification history among the plurality of the history data.

With reference now back to FIG. 4A, in step 408, the server computer (151) terminates the process mentioned above.

With reference now to FIG. 4B, in step 411, the server computer (151) starts the process for generating a history data and then analyzing the history data to associate one or more test cases with one or more source code parts, or vice versa. The process may start, for example, in a case where the server computer (151) receives the set of the one or more modification histories, the build-and-deploy data, and the one or more test operation histories.

In step 412, the server computer (151) receives the set of the one or more modification histories, the build-and-deploy data, and the one or more test operation histories. Step 412 may be repeated, for example, at the time when the server computer (151) receives the set.

In step 413, the server computer (151) generates a history data from the one or more modification histories, the build-and-deploy data, and the one or more test operation histories.

Steps 414 to 417 correspond to step 404 to 407 described in FIG. 4A, respectively. Accordingly, the explanations of steps 414 to 47 will be omitted here.

In step 418, the server computer (151) terminates the process mentioned above.

According to the processes described in FIGS. 3A and 4A or FIGS. 3B and 4B, an association between one or more test cases and one or more source code parts for a test target can be found automatically.

With reference now to FIG. 10, FIG. 10 illustrates an embodiment of an exemplified diagram of finding one or more test cases which are not present in a repository for test cases.

The association generated according to an embodiment of the present invention can be utilized so as to inform a user of a test case(s) to be carried out.

Further, the association can be utilized so as to find a new test case(s). The test operation history (1001) comprises a part (1011) which is identical with a part (1031) in Test Case 1 (1021) and a part) (1012) which is identical with a part (1032) in Test Case 2 (1022). However, there is no test case for a part (1041) and a part (1042). Accordingly, a system can notify a user of the parts (1041 and 1042) in order to prepare a new test case(s).

Figure 11:
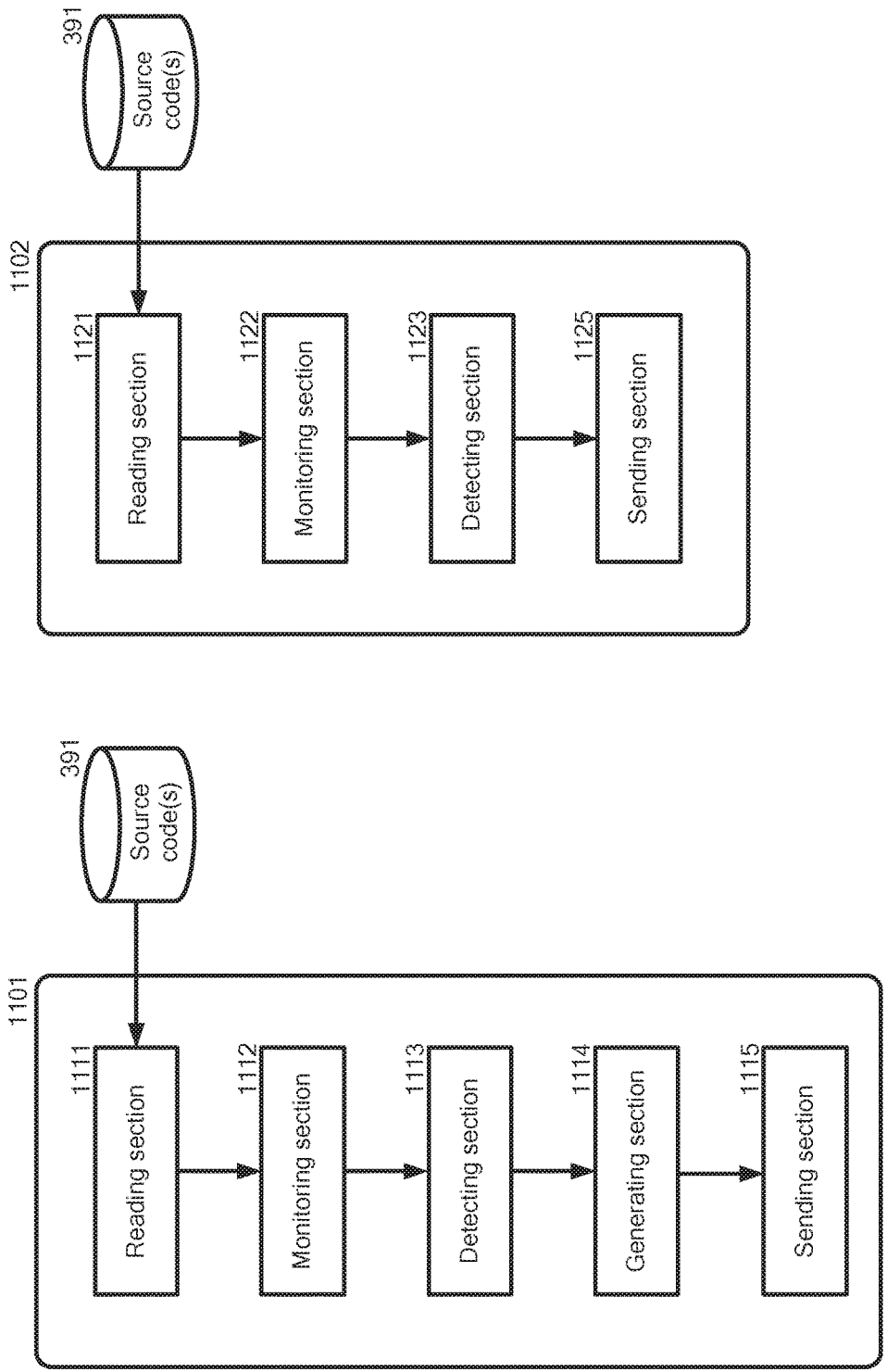
FIG. 11 illustrates an embodiment of an overall functional block diagram of a user computer which can be used in accordance with one embodiment of the flowcharts described in FIGS. 3A and 3B.
Figure 12:
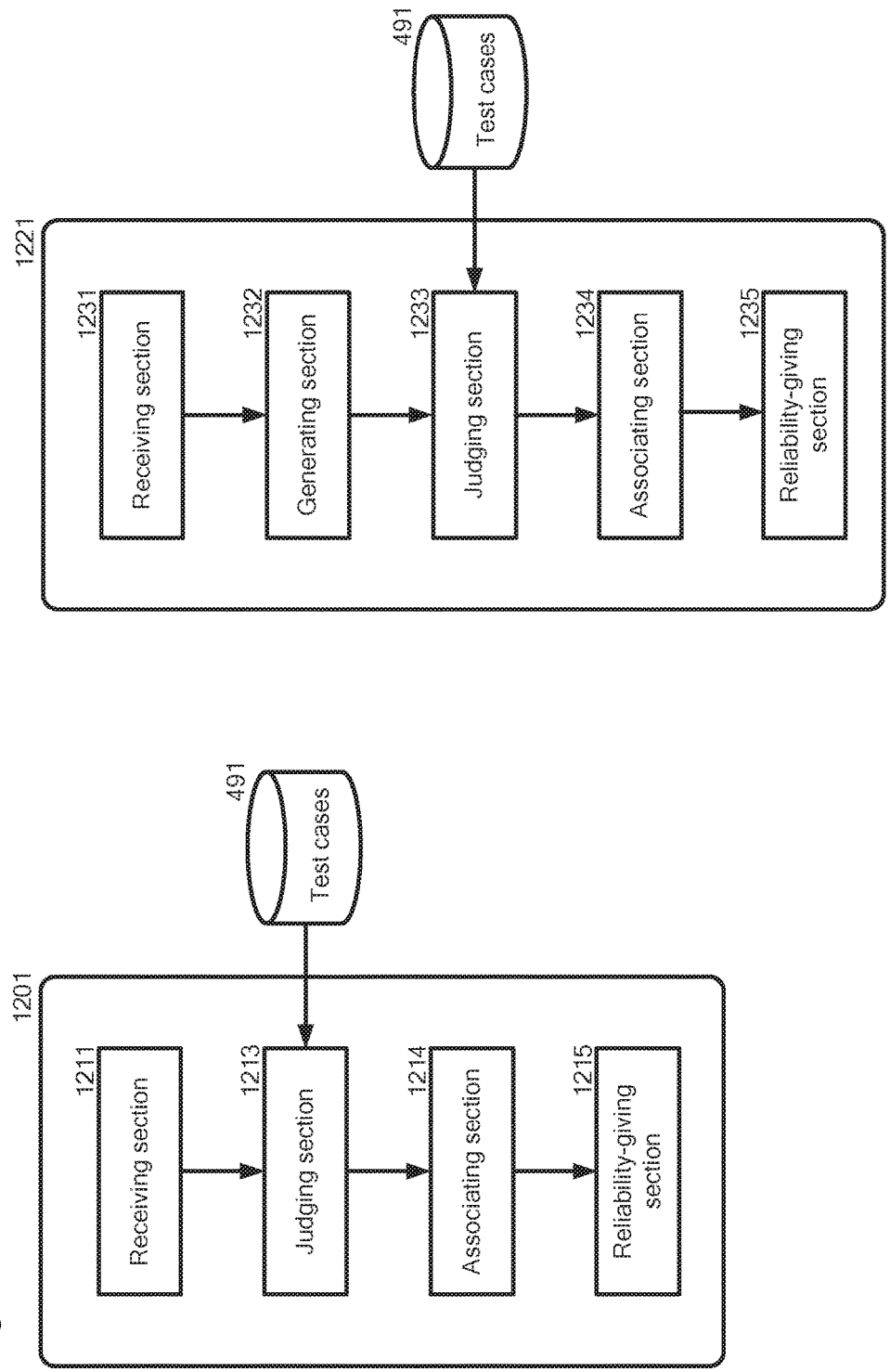
FIG. 12 illustrates an embodiment of an overall functional block diagram of a server computer which can be used in accordance with one embodiment of the flowcharts described in FIGS. 4A and 4B.

FIGS. 11 and 12 illustrate an embodiment of an overall functional block diagram of a user computer and a server computer, respectively.

With reference now to FIG. 11, FIG. 11 illustrates two embodiments of the user computer (1101 and 1102) which can be used in accordance with one embodiment of the flowcharts described in FIGS. 3A and 3B, respectively.

The user computer (1101) may perform the process described in FIG. 3A.

The user computer (1101) may comprise a reading section (1111), a monitoring section (1112), a detection section (1113), a generating section (1114), and a sending section (1115).

The reading section (1111) may perform step 302.

The monitoring section (1112) may perform step 309.

The detection section (1113) may perform steps 303 to 306.

The generating section (1114) may perform the generation of a history data, which is performed in step 307.

The sending section (1115) may perform the sending of the history data, which is performed in step 307.

The user computer (1101) may correspond to the user computer (121) described in FIG. 1B. The GUI section (131) may comprise the reading section (1111). The operation recording section (132) may comprise the monitoring section (1112) and the detection section (1113). The history data-generating section (133) may comprise the generating section (1114). The sending section (134) may comprise the sending section (1115).

The user computer (1102) may perform the process described in FIG. 3B.

The user computer (1102) may comprise a reading section (1121), a monitoring section (1122), a detection section (1123), and a sending section (1125). The user computer (1102) does not have the generating section (1114). This is because history data is generated in a server computer (1221) described in FIG. 12.

The reading section (1121), the monitoring section (1122) and the detection section (1123) correspond to the reading section (1111), the monitoring section (1112) and the detection section (1113), respectively.

The reading section (1121) may perform step 312.

The monitoring section (1122) may perform step 319.

The detection section (1123) may perform steps 313 to 316.

The sending section (1125) may perform step 317.

The user computer (1102) may correspond to the user computer (121) described in FIG. 1B. The GUI section (131) may comprise the reading section (1121). The operation recording section (132) may comprise the monitoring section (1122) and the detection section (1123). The sending section (134) may correspond to the sending section (1115).

With reference now to FIG. 12, FIG. 12 illustrates two embodiments of the server computers (1201 and 1022) which can be used in accordance with one embodiment of the flowcharts described in FIGS. 4A and 4B, respectively.

The server computer (1201) may perform the process described in FIG. 4A.

The server computer (1201) may comprise a receiving section (1211), a determination (or judgement) section (1213), an associating section (1214). Further, the server computer (1201) may optionally comprise a reliability-giving section (1215).

The receiving section (1211) may perform step 402.

The determination section (1213) may perform steps 404 and 405.

The associating section (1214) may perform step 406.

The reliability-giving section (1215) may perform step 407.

The server computer (1201) may correspond to the server computer (151) described in FIG. 1B. The receiving section (161) described in FIG. 1B may correspond to the receiving section (1211). The operation analysis section (163) described in FIG. 1B may comprise the determination section (1213) and the associating section (1214), and optionally the reliability-giving section (1215).

The server computer (1221) may perform the process described in FIG. 4B.

The server computer (1221) may comprise a receiving section (1231), a generating section (1232) a determination section (1233), an associating section (1234). Further, the server computer (1211) may optionally comprise a reliability-giving section (1235).

The receiving section (1231), the determination section (1233), the associating section (1234) and the reliability-giving section (1235) correspond to the reading section (1211), the determination section (1213), the associating section (1214) and the reliability-giving section (1215), respectively.

The receiving section (1231) may perform step 412.

The generating section (1232) may perform step 413.

The determination section (1233) may perform steps 414 to 415.

The associating section (1234) may perform step 416.

The reliability-giving section (1235) may perform step 417.

The server computer (1221) may correspond to the server computer (151) described in FIG. 1B. The receiving section (161) described in FIG. 1B may correspond to the receiving section (1231). The history data-generating section (162) described in FIG. 1B may comprise the generating section (1232). The operation analysis section (163) described in FIG. 1B may comprise the determination section (1233) and the associating section (1234), and optionally the reliability-giving section (1235).

Figure 13:
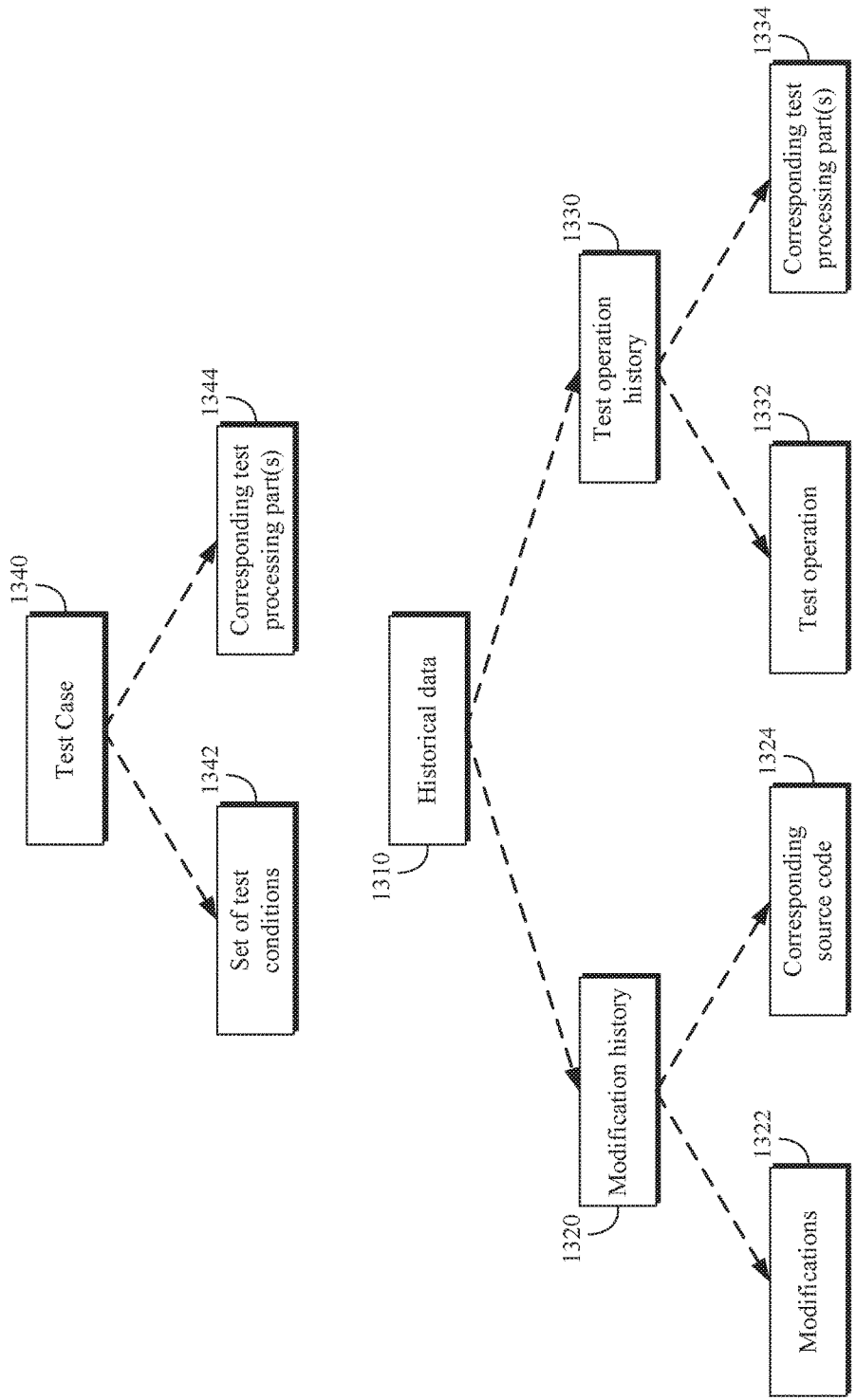
FIG. 13 is a hierarchical diagram depicting associations between relevant histories and system activities in accordance with at least one embodiment of the present invention.

FIG. 13 is a hierarchical diagram depicting associations between relevant histories and system activities in accordance with at least one embodiment of the present invention. As depicted, associations are constructed according to historical data 1310, which comprises a modification history 1320 and a test operation history 1330. The modification history 1320 includes one or more modifications 1322 and one or more corresponding source code parts 1324. The test operation history 1330 includes one or more test operations 1332 and one or more corresponding test processing parts 1334. The historical data is used to build an association with a test case 1340. The test case 1340 includes a set of test conditions 1342 and one or more corresponding test processing parts 1344.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for associating one or more test cases with one or more source code parts for a test target comprising:

obtaining historical data comprising one or more modification histories and one or more associated test operation histories, wherein a modification history comprises one or more modifications made in one or more source code parts, and a test operation history comprises one or more test processing parts corresponding to one or more test operations conducted on a test target after the one or more modifications;

for each of the historical data, determining whether a test operation history has one or more test processing parts which are identical or similar to test processing parts in one or more test cases;

associating the one or more test cases with one or more source code parts in one or more modification histories which have been associated with the test operation history responsive to determining that the test operation history has one or more test processing parts which are identical or similar to test processing parts in one or more test cases; and assigning a degree of reliability to each of the plurality of associations between the one or more test cases and the one or more source code parts, wherein the degree of reliability is directly correlated with the presence of verification parts such that a degree of reliability is lower for each of the plurality of associations for which verification parts are not present than it is for other associations of the plurality of associations for which verification parts are present.

2. The method according to claim 1, wherein an association between the one or more modification histories and the one or more test operation histories is determined by finding, from one or more user operation histories made in a time sequence order, a set of one or more source code modifications and one or more test operations and generating historical data for the set.

3. The method according to claim 1, wherein an association between the one or more test cases and one or more source code parts is determined by associating the one or more test cases with the test operation history in the historical data.

4. The method according to claim 1, wherein at least one of the one or more test cases is one which has been prepared by deleting, from an original test case which comprises one or more operation parts, one or more data parts and one or more verification parts, the one or more verification parts.

5. The method according to claim 1, wherein the test case is one which has been prepared by deleting, from an original test case which comprises one or more test processing parts, a pre-processing part which is carried out before the one or more test processing parts are carried out and a post-processing part which is carried out after the one or more test processing parts are carried out.

6. The method according to claim 1, wherein the test case comprises one or more operation parts, one or more data parts and one or more graphical user interface component IDs.

7. The method according to claim 1, wherein the test operation history comprises one or more operation parts, one or more data parts and one or more graphical user interface component IDs.

8. The method according to claim 1, wherein the determination is carried out using a sequential pattern mining.

9. The method according to claim 1, wherein the determination is carried out by comparing a whole or part of the test operation history with a whole or part of each of the one or more test cases.

10. The method according to claim 1, wherein a test operation is carried out on a graphical user interface.

11. The method according to claim 1, wherein the degree of reliability of an association is inversely correlated to number of modification histories corresponding to the association.

12. The method according to claim 1, wherein the degree of reliability of an association is directly correlated to an amount of time elapsed since an earliest operation in a modification history corresponding to the association was carried out.

13. The method according to claim 1, wherein the degree of reliability of an association is directly correlated to an amount of time elapsed since an earliest operation in the test operation history was carried out.

14. The method according to claim 1, wherein the degree of reliability of an association is directly correlated to an amount of time elapsed since a corresponding test operation history was generated.

15. The method according to claim 1, wherein the degree of reliability of an association is inversely correlated to a number of modification histories corresponding to the test operation history corresponding to the association.

* * * * *